United States Patent [19]
Okamoto et al.

[11] Patent Number: 5,241,434
[45] Date of Patent: Aug. 31, 1993

[54] MAGNETIC RECORDING SIGNAL REPRODUCING APPARATUS

[75] Inventors: Kaneyuki Okamoto; Hideo Nishijima; Yoshiaki Umehara; Yuji Inaba, all of Katsuta, Japan

[73] Assignee: Hitachi, Ltd., Tokyo, Japan

[21] Appl. No.: 697,022

[22] Filed: May 8, 1991

[30] Foreign Application Priority Data

May 11, 1990 [JP] Japan .................................. 2-119804
Aug. 10, 1990 [JP] Japan .................................. 2-210359

[51] Int. Cl.$^5$ ............................................. G11B 21/10
[52] U.S. Cl. .............................. 360/77.14; 360/78.02; 360/74.3; 360/84
[58] Field of Search ................. 360/77.14, 78.02, 74.3, 360/84

[56] References Cited

U.S. PATENT DOCUMENTS

| | | | |
|---|---|---|---|
| 4,402,023 | 8/1983 | Hiraguri | 360/77.14 |
| 4,513,229 | 4/1985 | Kudelski | 360/74.3 |
| 5,053,890 | 10/1991 | Namiki | 360/77.14 |

FOREIGN PATENT DOCUMENTS

| | | |
|---|---|---|
| 62-267955 | 11/1987 | Japan . |
| 63-19929 | 4/1988 | Japan . |
| 64-82356 | 3/1989 | Japan . |
| 1-317255 | 12/1989 | Japan . |

Primary Examiner—William L. Sikes
Assistant Examiner—Scott A. Ouellette
Attorney, Agent, or Firm—Antonelli, Terry, Stout & Kraus

[57] ABSTRACT

The specification discloses a magnetic recording signal reproducing apparatus for controlling a magnetic tape and reproducing magnetic heads.

In the magnetic recording signal reproducing apparatus of the invention, a magnetic tape which is moved for magnetic heads attached to a rotary cylinder is traced by the magnetic heads and signals recorded on tracks of the magnetic tape are reproduced. A construction of the apparatus includes a tracking control system, a tape tension control system, and an apparatus for selectively switching operations of both of the control systems. The tracking control system includes: an apparatus, attached to the rotary cylinder, for moving the magnetic heads in the width direction of the tracks in accordance with a tracking signal; and an apparatus for sampling the signals detected by the magnetic heads, for comparing a preceding sampled value with a present sampled value, and for generating the tracking signal such that the present sampled value is larger than the preceding sampled value. The tape tension control system includes: an apparatus for detecting changes per predetermined time in levels of the signals detected by the magnetic head; an apparatus for giving a tension to the moving magnetic tape and for adjusting the tension in accordance with a tension control signal; and an apparatus for generating the tension control signal to adjust the tension according to change amounts per predetermined time of the signal levels to a reference value. Further, the switching apparatus includes switching means for receiving the signals detected by the magnetic heads and for selectively energizing either one of the tracking control system and the tape tension control system in accordance with the levels of the signals. Another magnetic recording signal reproducing apparatus according to the invention comprises: two magnetic heads arranged to a cylinder so as to simultaneously trace adjacent tracks; an apparatus, attached to the cylinder, for individually moving the two magnetic heads in the width direction of the tracks in accordance with a head position control signal; and an apparatus for generating the head position control signal to move the magnetic heads in the width direction of the tracks in a manner such that when the recorded signals are reproduced at a speed different from a tape moving speed upon recording, amplitude levels of the reproduction signals detected by the two magnetic heads locating at predetermined track positions have a relation of opposite phases.

12 Claims, 24 Drawing Sheets

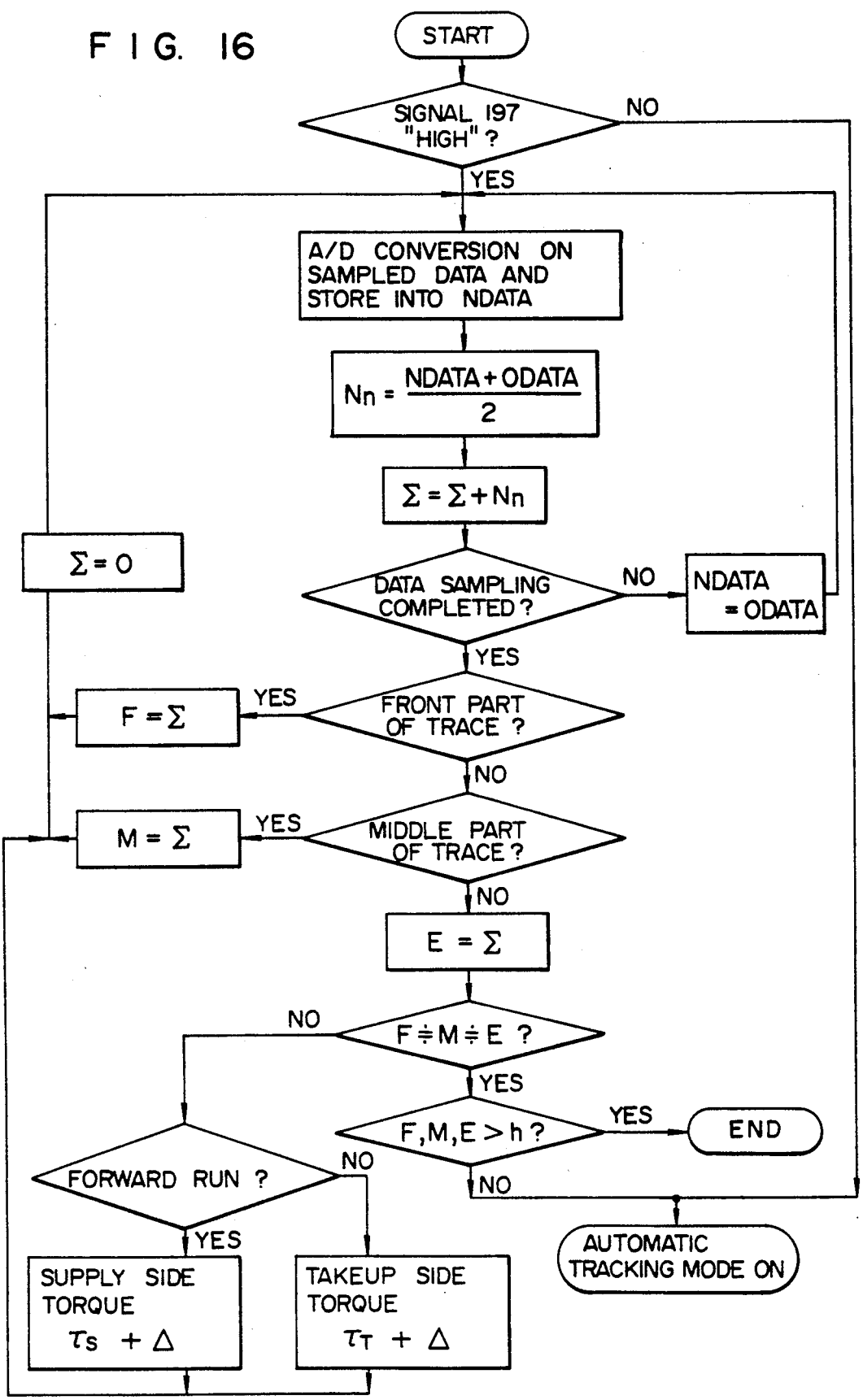

F I G. 25A
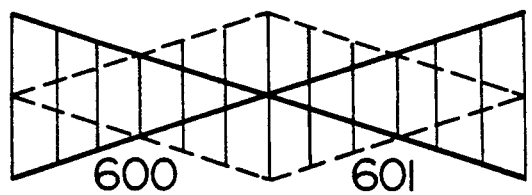
F I G. 25B
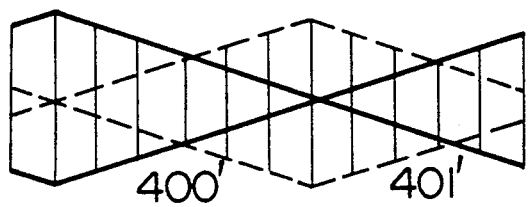
F I G. 25C
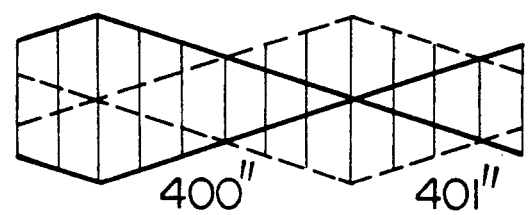

MAGNETIC RECORDING SIGNAL REPRODUCING APPARATUS

BACKGROUND OF THE INVENTION

The present invention relates to a magnetic recording signal reproducing apparatus of a digital system and, more particularly, to a control unit of a magnetic tape and a magnetic head.

As a head control technique, an apparatus in which a moving mechanism is added to a reproducing head and the reproducing head is moved in the width direction of a track and a tracking error is prevented has been disclosed in, for instance, JP-B-63-19929 as a published Official Gazette of Japanese Patent Application filed by Sony Corporation on Mar. 13, 1980. On the other hand, apparatuses for controlling a tape tension to prevent a decrease in reproduction signal level due to a lack of tension of a tape which runs have been disclosed in JP-A-64-82356 as a published Official Gazette of Japanese Patent Application filed on Sep. 25, 1987, by Hitachi Ltd., JP-A-62-267955 as a published Official Gazette of Japanese Patent Application filed on May 15, 1986, by Sony Corporation, and JP-A-1-317255 as a published Official Gazette of Japanese Patent Application filed on Jun. 17, 1988, by Hitachi Electronics Co., Ltd.

In the magnetic recording/reproducing apparatus of the helical scan type, magnetic heads for recording and reproduction are attached to a rotary cylinder, a magnetic tape is wound around the cylinder and is run, and the recording and reproduction are executed. In the reproducing mode, there are problems such as defective reproduction which occurs because the magnetic tape is not closely adhered to the cylinder surface, defective reproduction due to a curve of a recording track, and deterioration in picture quality by a noise bar which occurs in the case of reproducing at a tape speed different from a recording tape speed as in the searching mode.

In the conventional apparatuses, the optimum control cannot be selected in accordance with all of the causes of the defective reproduction.

SUMMARY OF THE INVENTION

It is an object of the invention to provide a magnetic recording signal reproducing apparatus having a control unit of a novel construction which can solve various problems of the above magnetic recording signal reproducing apparatus in a lump.

According to a magnetic recording signal reproducing apparatus of the invention, a magnetic tape which is moved for magnetic heads is traced by the magnetic heads attached to a rotary cylinder, thereby reproducing signals recorded on tracks of the magnetic tape. A construction of the apparatus includes a tracking control system, a tape tension control system, and an apparatus for selectively switching the operations of both of the control systems. The tracking control system includes: an apparatus which is attached to the rotary cylinder and moves the magnetic heads in the width direction of the tracks in accordance with a tracking signal; and an apparatus for sampling a signal detected by the magnetic heads, for comparing a preceding sampled value and a present sampled value, and for generating the tracking signal so as to set the present sampled value to be larger than the preceding sampled value. The tape tension control system includes: an apparatus for detecting a change per predetermined time in a level of the signal detected by the magnetic heads; an apparatus for giving a tension to the moving magnetic tape and for adjusting the tension in accordance with a tension control signal; and an apparatus for generating the tension control signal to adjust the tension according to the change amount per predetermined time of the signal level to a reference value. Further, the switching apparatus includes switching means for receiving the signal detected by the magnetic heads and for selectively energizing either one of the tracking control system and the tape tension control system in accordance with the signal level.

In another magnetic recording signal reproducing apparatus according to the invention, a magnetic tape which is moved for magnetic heads is traced by the magnetic heads attached to a rotary cylinder and digital signals recorded on tracks of the magnetic tape are reproduced. The apparatus comprises: two magnetic heads attached to the cylinder so as to simultaneously trace adjacent tracks; an apparatus which is attached to the cylinder and individually moves the two magnetic heads in the width direction of the tracks in accordance with a head position control signal; and an apparatus for generating the head position control signal to move the magnetic heads in the width direction of the tracks in a manner such that when a recording signal is reproduced at a speed different from a tape moving speed in the recording mode, there is a relation of opposite phases between amplitude levels of the reproduction signals by the two magnetic heads at predetermined track positions.

According to the former magnetic recording signal reproducing apparatus, time fluctuations of the reproduction signals derived from the magnetic heads are detected to thereby discriminate whether a defective reproduction has occurred due to a defective tape tension or a curve of the track, and either one of the tape tension control and the head movement control is selected and executed in accordance with the result of the discrimination.

According to the latter magnetic recording signal reproducing apparatus, the digital recorded signals are reproduced. In the digital recording, signals are simultaneously written by the two magnetic heads and two adjacent recording tracks are simultaneously reproduced by the two magnetic heads. Therefore, when the magnetic tape is reproduced at a reproducing tape speed different from the recording tape speed, if a level of the reproduction signal from one of the heads has decreased, the other head is moved in the width direction of the tracks and a large reproduction signal is obtained, thereby preventing a noise bar so as to mutually interpolate the reproduction output of the other head.

BRIEF DESCRIPTION OF THE DRAWINGS

FIG. 16 is a flowchart showing the operation of a part of the embodiment of FIG. 8;

FIGS. 21A to 21C, 24A, 24B, 25A to 25C, 26A, and 26B are explanatory diagrams of the embodiment of FIG. 19;

DESCRIPTION OF THE PREFERRED EMBODIMENTS

Figure 1:
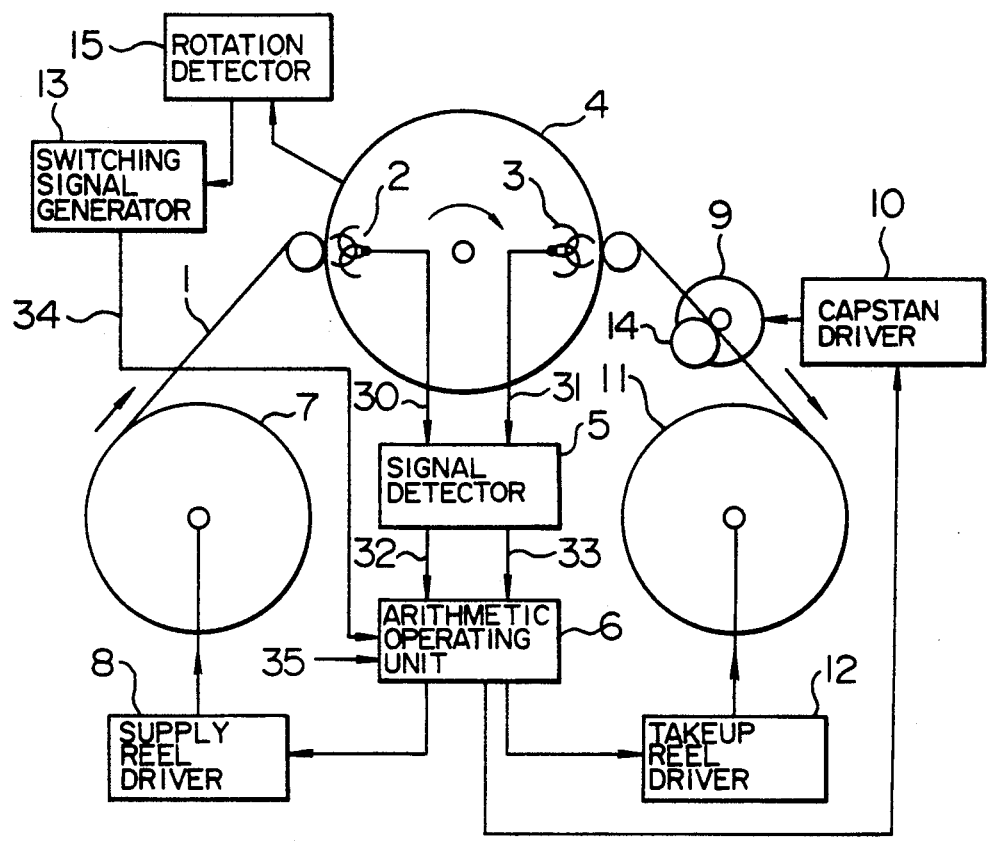
FIG. 1 is a block diagram showing an example of a tape tension control system.

An embodiment of a tape tension control system of a magnetic recording signal reproducing apparatus will be described with reference to FIG. 1. In FIG. 1, reference numeral 1 denotes a magnetic tape; 2 and 3 rotary heads; 4 a rotary drum; 5 a signal detector; 6 an arithmetic operating unit; 7 a supply reel; 8 a supply reel driver; 9 a capstan; 10 a capstan driver; 11 a take-up reel; 12 a take-up reel driver; 13 a switching signal generator; 14 a pinch roller; and 15 a rotation detector to detect the rotation of the drum 4. The rotary heads 2 and 3 are attached onto the rotary drum and rotated. The signal detector 5 amplifies signals which are reproduced from recording tracks of the magnetic tape 1 by the rotary heads 2 and 3 and, thereafter, detects envelopes. In accordance with an output of the rotation detector 15 of the rotary drum 4, the switching signal generator 13 generates a switching signal which substantially coincides with a period of time when the rotary heads 2 and 3 are come into contact with the magnetic tape 1.

Figure 2:
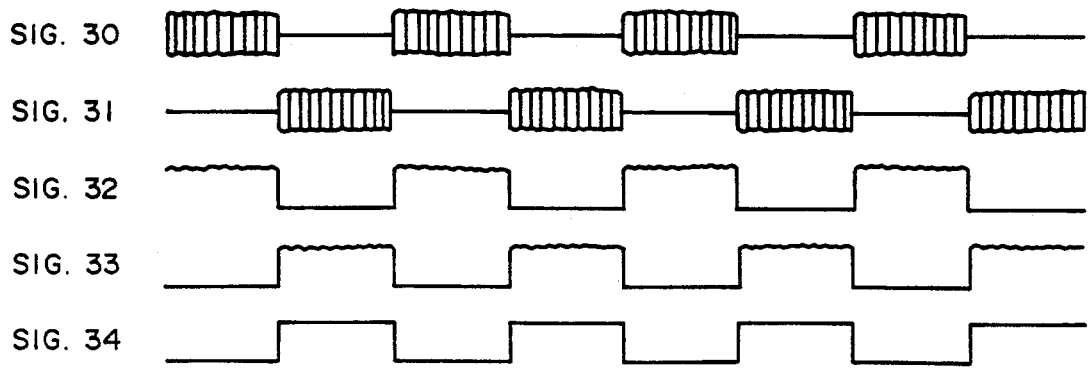
FIG. 2 is a waveform diagram of a main section in FIG. 1.
Figure 3:
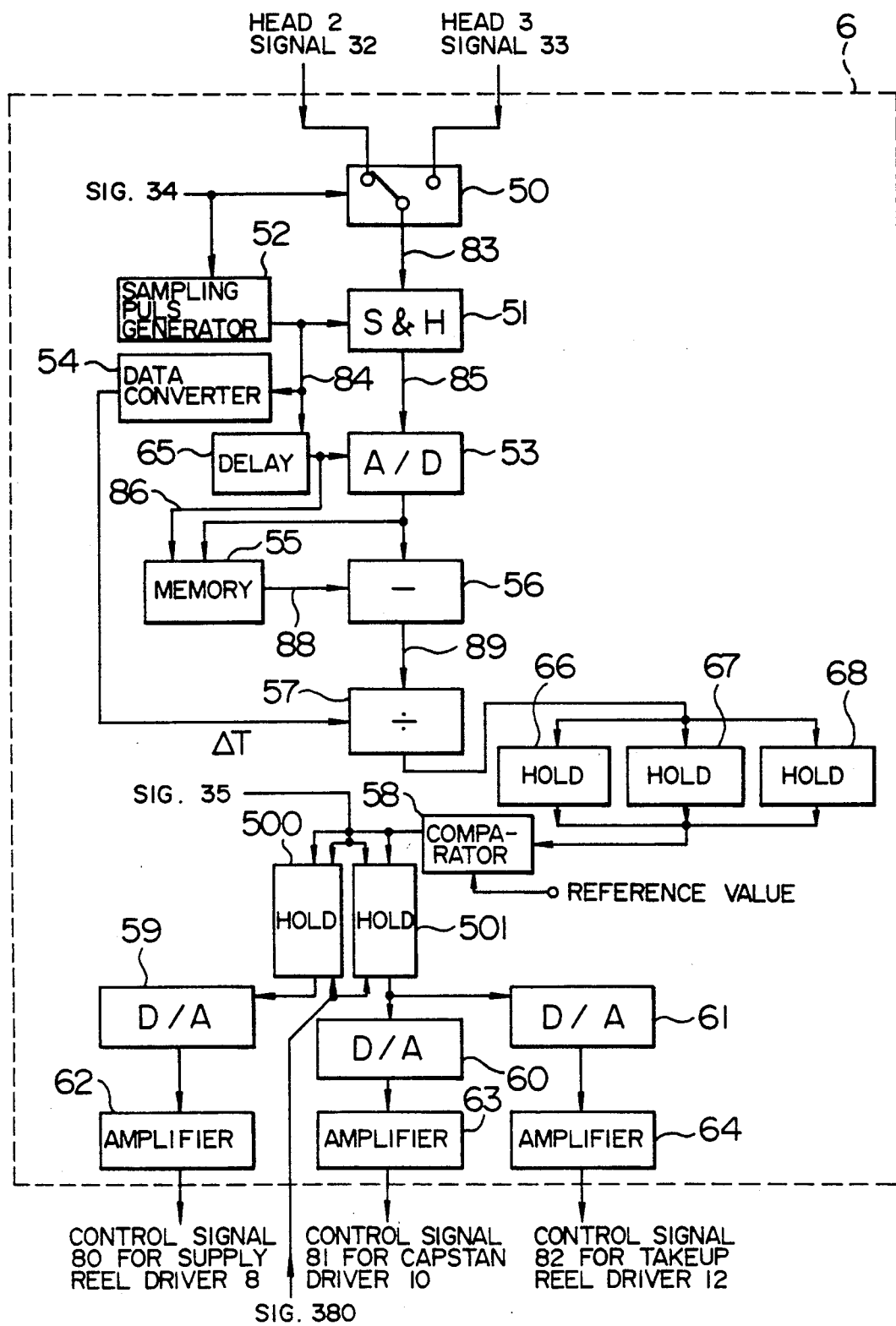
FIG. 3 is a block diagram showing an example of component elements in FIG. 1.

Frequencies of reproduction signals (30 and 31 in FIG. 2) which are reproduced from the magnetic tape 1 by the rotary heads 2 and 3 are set to frequency modulated high frequencies of a megahertz unit. Signals 32 and 33 are derived by envelope-detecting and amplifying the frequency modulated reproduction signals. The signals are processed by the arithmetic operating unit 6 every channel in accordance with a signal 34 which changes by one period per rotation in accordance with the rotation of the rotary drum 4. The arithmetic operating unit 6 calculates time-dependent changes of the signals 32 and 33, that is, intuitively calculates shapes of waveforms and converts into data regarding a strength of tension of the magnetic tape 1. A practical example regarding a method of converting into the data with respect to the strength of tape tension will now be described with reference to a block diagram of FIG. 3 and an operation explanatory diagram of FIG. 4. In FIG. 3, reference numeral 50 denotes a change-over switch; 51 a sample and hold (S/H) circuit; 52 a sampling pulse generator; 53 an analog-digital converter (A/D converter); 54 a data converter; 55 a memory; 56 a difference calculator; 57 a divider; 58 a comparator; 59, 60, and 61 digital-analog converters (D/A converters); 62, 63, and 64 amplifiers or attenuators; 65 a delay circuit; and 66 to 68, 500, and 501 data holders.

The operation will now be described hereinbelow.

Figure 4:
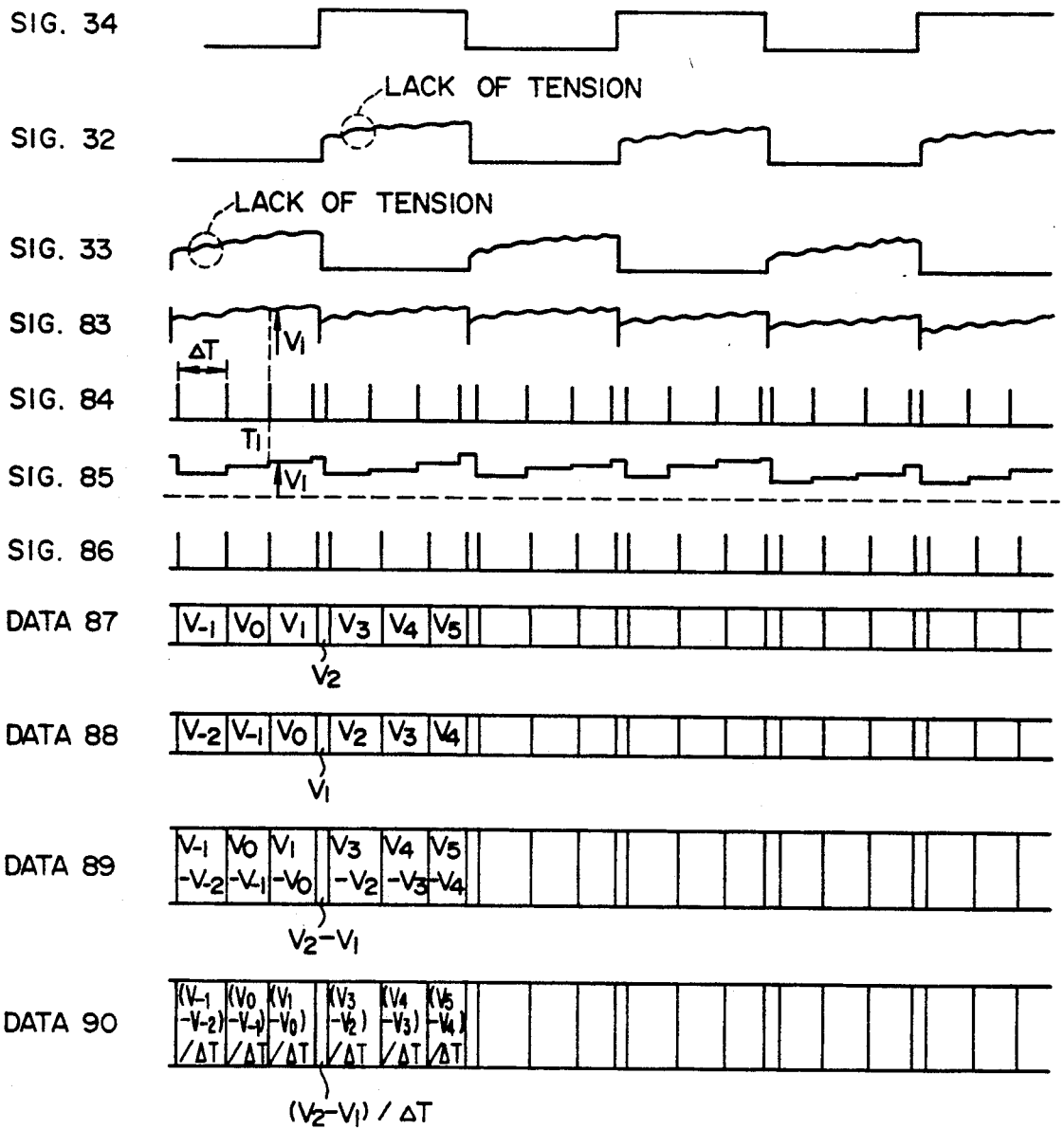
FIGS. 4, 5A, and 5B are operation explanatory diagrams of the block diagram of FIG. 3.

The signals 32 and 33 whose envelopes have been detected are switched by the change-over switch 50 synchronously with the signal 34. By the above switching operation, a signal 83 (FIG. 4) which is continuous with respect to the time is generated from the switch 50. On the other hand, the pulse generator 52 generates a pulse train signal 84 by using the switching signal 34 as trigger. The case where a pulse train signal of a time interval $\Delta T$ excluding a switching point of the signal 34 has been generated will now be considered as an example (signal 84 in FIG. 4). When the signal 83 is sampled and held by using the signal 84 as a trigger, a signal 85 is generated as a result. Further, a signal 86 which has been delayed by a short time by the delay circuit 65 is generated by using the pulse train signal 84 as a trigger. The A/D converter 53 is made operative by using the signal 86 as a trigger. For instance, a voltage $V_1$ which is obtained by sampling and holding the signal 83 at a time point $T_1$ is A/D converted. Now, assuming that a group of data derived by the above A/D conversion is set to data 87, the data 87 are a group of data $V_{-1}, V_0, V_1, V_2$, which change every input of the signal 86 so as to almost coincide with each other. The data group 87 is delayed one period by one by the memory 55, so that delayed data 88 is derived from the memory 55. Both of the data 87 and 88 are supplied to the difference calculator 56, by which a subtraction of those data is executed. The data converter 54 receives the pulse train signal 84 and converts the times among the pulses of the signal 84 into the numerical value data. Assuming that the time interval data is set to $\Delta T$ as shown in FIG. 4, the divider 57 executes a calculation of $(V_n - V_{n-1})/\Delta T$ in which the numerical value data $\Delta T$ is used as a divisor and the difference data $(V_n - V_{n-1})$ (where, n is an integer) is used as a dividend. Thus, a data train 90 indicates a ratio of a change per unit time of a sample and held voltage of the reproduction signal. That is, the data train also indicates an inclination of the reproduction signal to a time base. The inclination data is temporarily held in the data holders 66 to 68. As will be explained herein later, a tension which is applied to the magnetic tape can be known by comparing the data held in the holders and a stored tension reference value of inclination data by the comparator 58. Data in a data holder 500 or 501 is changed on the basis of the tension data and is converted into the analog values by the D/A converters 59 to 61. The analog values are properly amplified or attenuated by the amplifiers or attenuators 62 to 64 and are supplied as control signal 80 to 82 to the supply reel driver 8, capstan driver 10, and take-up reel driver 12, respectively. By further adding the control signals 80 to 82 to control signals which are used in the conventional technique and by supplying the resultant control signals to the above drivers, the control which is further finer than the conventional control is performed and a stable tape run can be obtained.

Figure 5A:
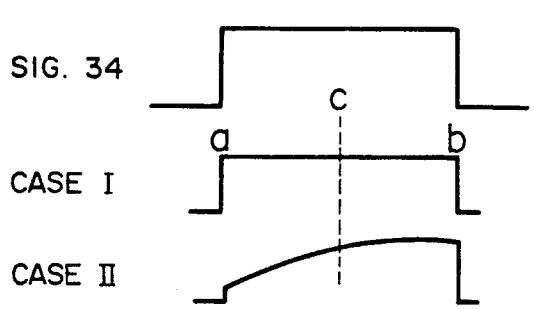

The relation between the comparison result of the inclination data (by the comparator 58) and the tape tension will now be described further in detail hereinbelow. FIG. 5A shows waveforms of the reproduction signal for the switching signal in the cases (I) and (II).

Figure 5B:
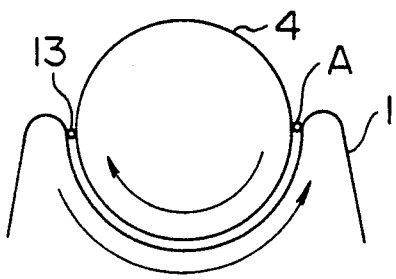

FIG. 5B shows rotating directions of the tape and the drum. The case where the rotating direction of the drum is opposite to the running direction of the tape as shown in FIG. 5B will now be considered as an example. However, a similar idea can be also applied to the case where those directions are set to the directions opposite to those shown in the diagram. When the reproducing head has reached point A, the head starts the track scan. Therefore, a time point a corresponds to the timing for the switching signal. Now, assuming that the tension is set to a proper value, the reproduction signal is set to a predetermined level as shown in the case (I). However, if the tape tension is weak, a contact force between the head and the tape is weakened, so that the reproduction signal level is reduced as shown in the case (II). In the embodiment, a decrease in reproduction signal level is regarded as a differentiation coefficient of the reproduction signal and is detected by comparing with the value at a middle point (time point c) at which the heads are in contact with the tape. For instance, in the cases (I) and (II), values (differentiation coefficients of the reproduction signal) of the data 90 near the time points a, c, and b are as shown below.

|      | Time point a (da) | Time point c (dc) | Time point b (db) |
|------|-------------------|-------------------|-------------------|
| Case (I)  | 0        | 0        | 0        |
| Case (II) | $+\alpha$ | $+\beta$ | $+\gamma$ |

(where $\alpha, \beta, \gamma$ are positive numerical values.)

When the above values are large, this means that a degree of flatness of the reproduction data is zero and that the tape tension lacks. Therefore, a fact that the absolute values of those values are higher than a predetermined level is detected by the comparator 58. In such a case, the data in the data holder 500 or 501 (a counter can be also used) is slightly increased. The data holders 500 and 501 are reset in an auto-tracking mode. In response to a signal 380, data holders 500 and 501 are activated to start count mode. When the tape is forwardly run, the holder 500 operates and when the tape is reversely run, the holder 501 operates in accordance with a (forward/reverse control) signal 35. Output signals of the holders 500 and 501 are converted into analog values by the D/A converters 59 to 61 and are properly amplified by the amplifiers 62 to 64 and are applied to the signal 80 or signals 81 and 82 as signals to increase the tape tension. Such increasing controls of the control output 80 or control outputs 81 and 82 are executed in the following manner. That is, in the case of the reproduction signal as shown in the case (II) in FIG. 5A, since the tension generally lacks, the tension is increased. For this purpose, a load torque of the tape run is increased. Now, assuming that the tape runs in the forward direction, the take-up side of the tape is pressed by the capstan 9 in FIG. 1 and the side of the supply reel 7 functions as a brake. Therefore, the data in the data holder 500 is slightly increased. At the above case, it is assumed that the data in the data holder 501 is in a holding state. The above correction is continued until the waveform of the reproduction signal becomes as shown in the case (I) in FIG. 5A. On the contrary, in the case where the tape runs in the reverse direction, the data in the holder 500 is held and only the data in the data holder 501 is increased.

Figure 6:
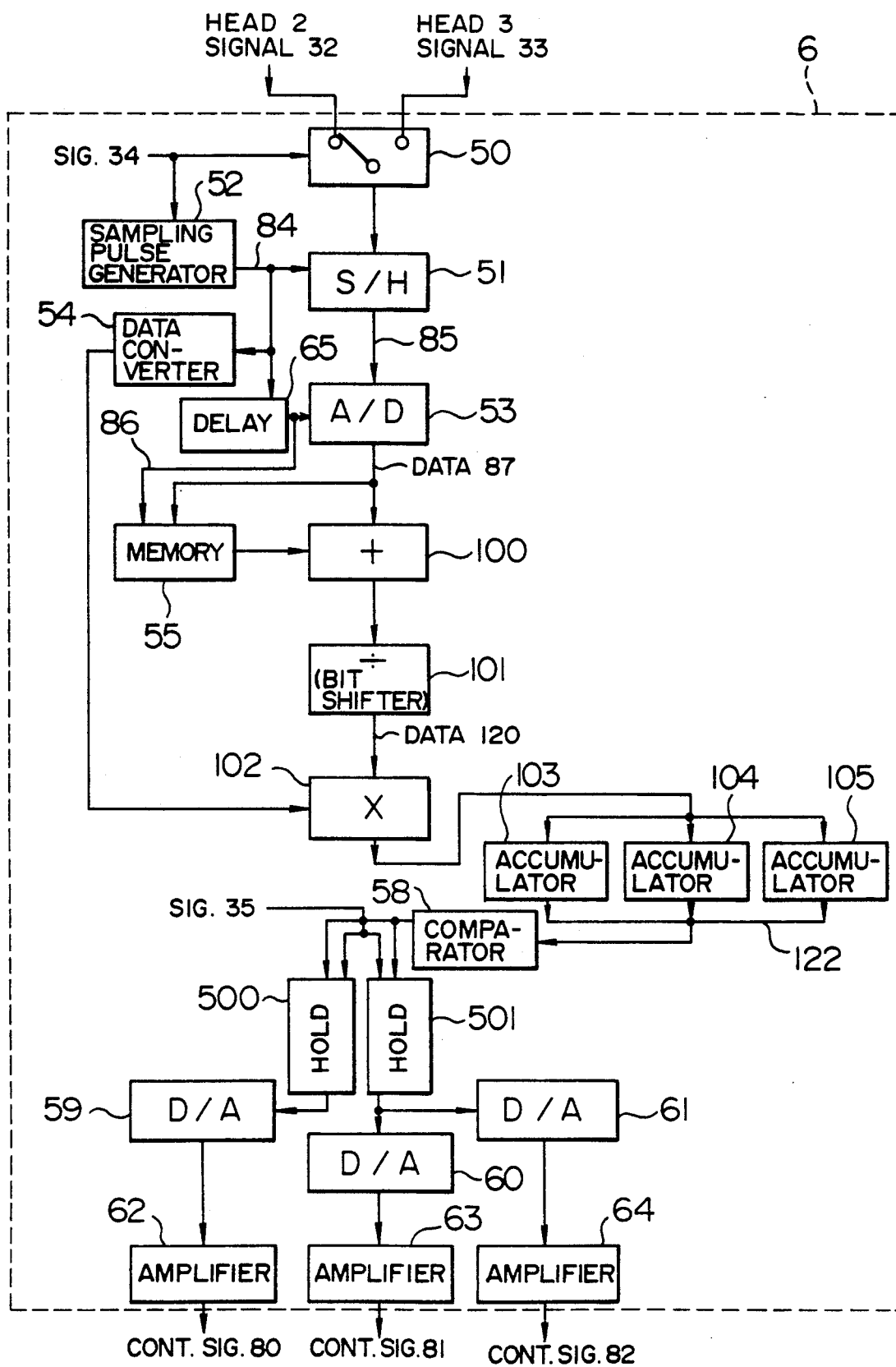
FIG. 6 is a block diagram showing another example of a main section in the construction of the embodiment of FIG. 1.
Figure 7:
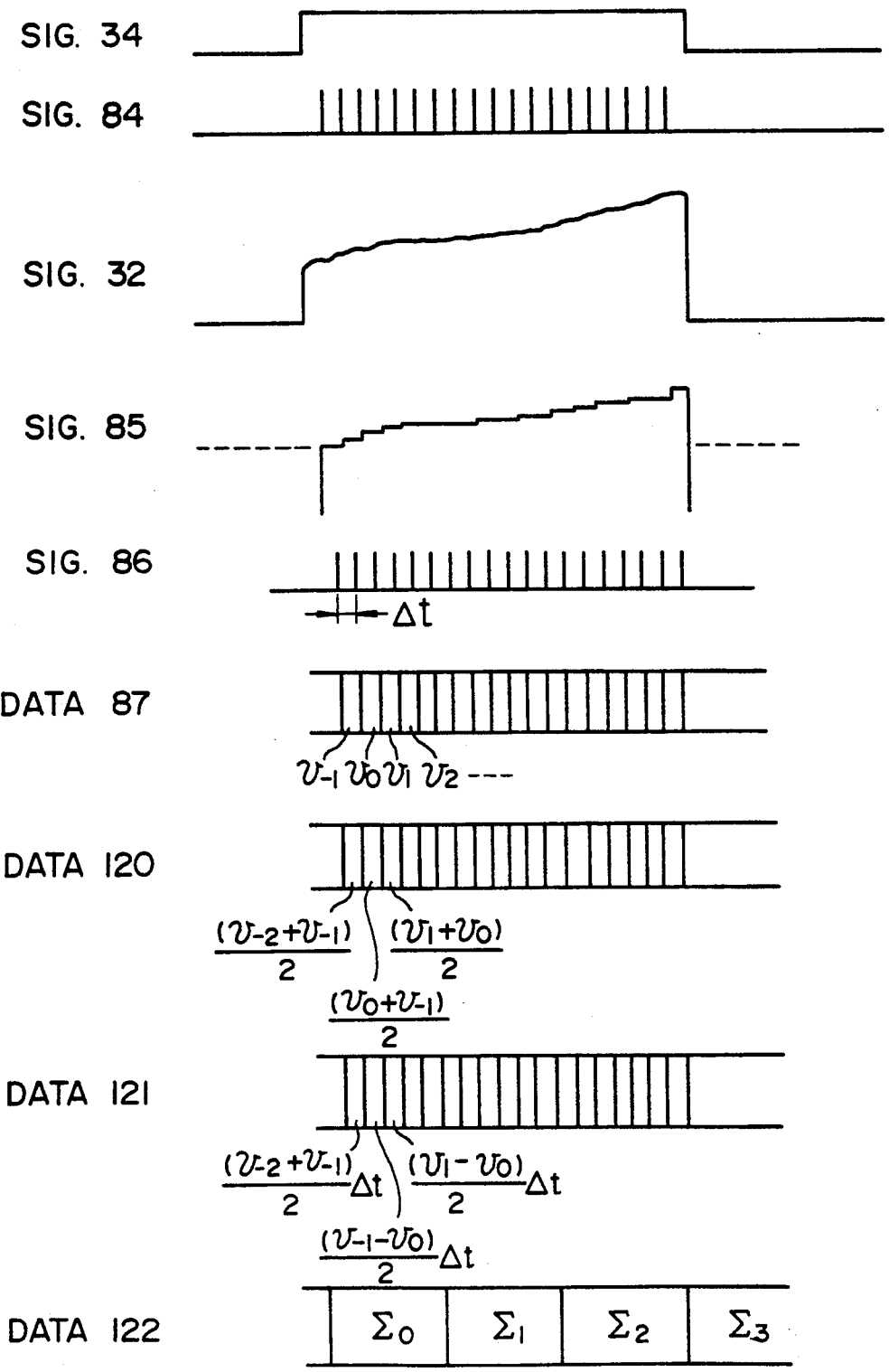
FIG. 7 is an operation explanatory diagram of the block diagram of FIG. 6.

An example of a tape tension control system will now be described with reference to FIG. 6. In the diagram, reference numeral 100 denotes an adder; 101 a divider or a bit shifter; 102 a multiplier; and 103 to 105 accumulators. The other construction is almost similar to that in the example of FIG. 3. In the example of FIG. 6, $\Delta T$ is set to be finer and the signal level is integrated by the time and the resultant data is compared with respect to the front, middle, and rear parts of the track. The detailed operation will now be explained hereinbelow.

In the data 87 obtained as shown in FIG. 4 in the above example, two continuous data $v_n$ and $v_{n-1}$ are added by the adder 100 and an addition data from the adder 100 is divided by 2 by the divider or bit shifter 101, thereby obtaining data 120. Further, by multiplying time data $\Delta t$ to the data 120, an area of a rectangle of the $\Delta t$ interval of the signal 85 is derived (signal 121). Data 122 is obtained by individually adding the resultant data 121 by the accumulators 103 to 105 with respect to the front, middle, and rear parts of the half period of the signal 34. As shown in the above example, assuming that the data of the front, middle, and rear parts are set to $\Sigma_1, \Sigma_2$, and $\Sigma_3$, by respectively comparing the magnitudes of the data $\Sigma_1, \Sigma_2$, and $\Sigma_3$ by the comparator 58, it is possible to perform a discrimination which is almost similar to that in the foregoing example. That is, when differences among the data $\Sigma_1, \Sigma_2$, and $\Sigma_3$ are large, this means the lack of tape tension as shown in the case (II) in FIG. 5A. Therefore, the data in the data holder 500 or 501 is increased little by little in a manner similar to the above. The above operation is similar to that mentioned above. When the tape is forwardly run, the data in the data holder 500 is increased and the data in the holder 501 is held. When the tape is reversely run, the data in the data holder 500 is held and the data in the holder 501 is increased.

By comparing a state of the reproduction signal for an interval of one tracing operation of the rotary heads, the lack of contacting force between the head and the tape on the drum can be solved. Even in the case where there is further a curved portion in the recorded track, the correction can be accurately performed by using a mechanism for moving the heads in the direction perpendicular to the tracing direction, that is, a head moving mechanism.

Figure 8:
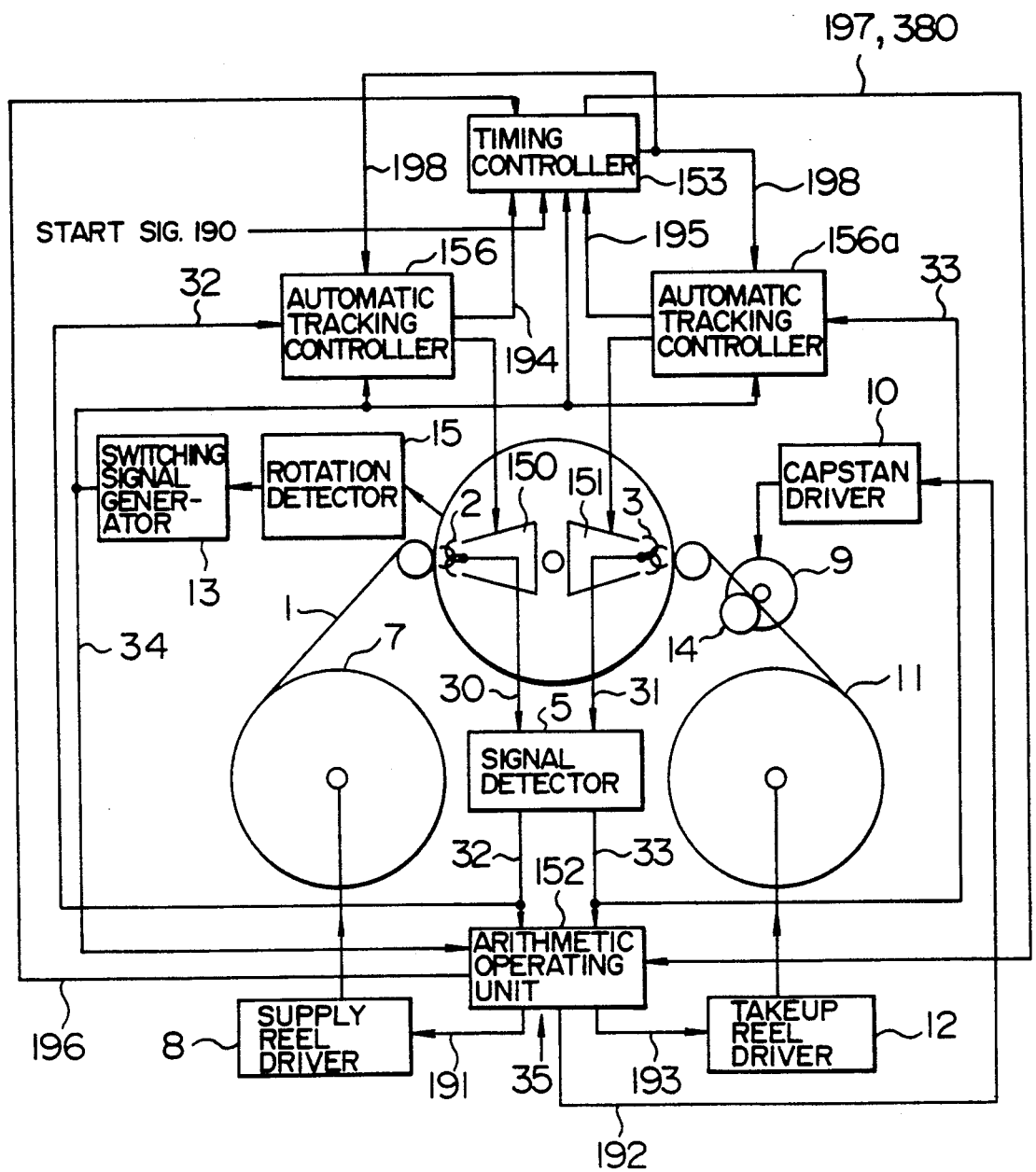
FIG. 8 is a block diagram showing an embodiment of a magnetic recording signal reproducing apparatus according to the invention.

FIG. 8 is a block diagram showing an embodiment of the invention in which the tape tension control system and the head position control system are combined. In the diagram, reference numerals 150 and 151 denote moving mechanisms to which the rotary heads 2 and 3 are attached and which move the heads in the width direction of the tracks; 152 an arithmetic operating unit; 153 a timing controller; 156 and 156a automatic tracking controllers for controlling the moving mechanisms. The embodiment mainly intends to control the operation timings in a manner such that the operations of the above moving mechanisms and the controllers and the tension control operations which are executed by making the supply reel controller, take-up reel controller, and capstan controller operative are smoothly performed without mutually interfering.

When a start signal 190 is first supplied to the system and the reproduction is started, the timing controller 153 activates the automatic tracking controllers 156 and 156a and also activates the arithmetic operating unit 152 and shuts out an output signal thereof. The moving mechanisms 150 and 151 are controlled by the automatic tracking controllers 156 and 156a so as to obtain the maximum amplitude at a predetermined tape tension. (Such a state is called an automatic tracking mode.) When the maximum amplitude level of signals 32 and 33 are almost obtained by the operations of the automatic tracking controllers 156 and 156a, the timing controller 153 is set into the next operating mode by signals 194 and 195. That is, the automatic tracking controllers 156 and 156a are inactivated and the arithmetic operating unit 152 is made operative, thereby activating the tape tension control operation which has already been described in detail in the foregoing embodiment. When reproduction signals are obtained in the tape tension control mode, this fact is informed to the timing controller 153 by a signal 196 and the operation is completed. If the reproduction signals of satisfactory levels are not obtained, the operations from the automatic tracking mode are further repeated again. However, if sufficient levels of such reproduction signals are not derived even after the above operations were executed a few times, the operation of the timing controller 153 is automatically stopped.

A detailed block diagram of the above components 152 to 156 is shown as an example and the detailed operations will now be described.

Figure 9:
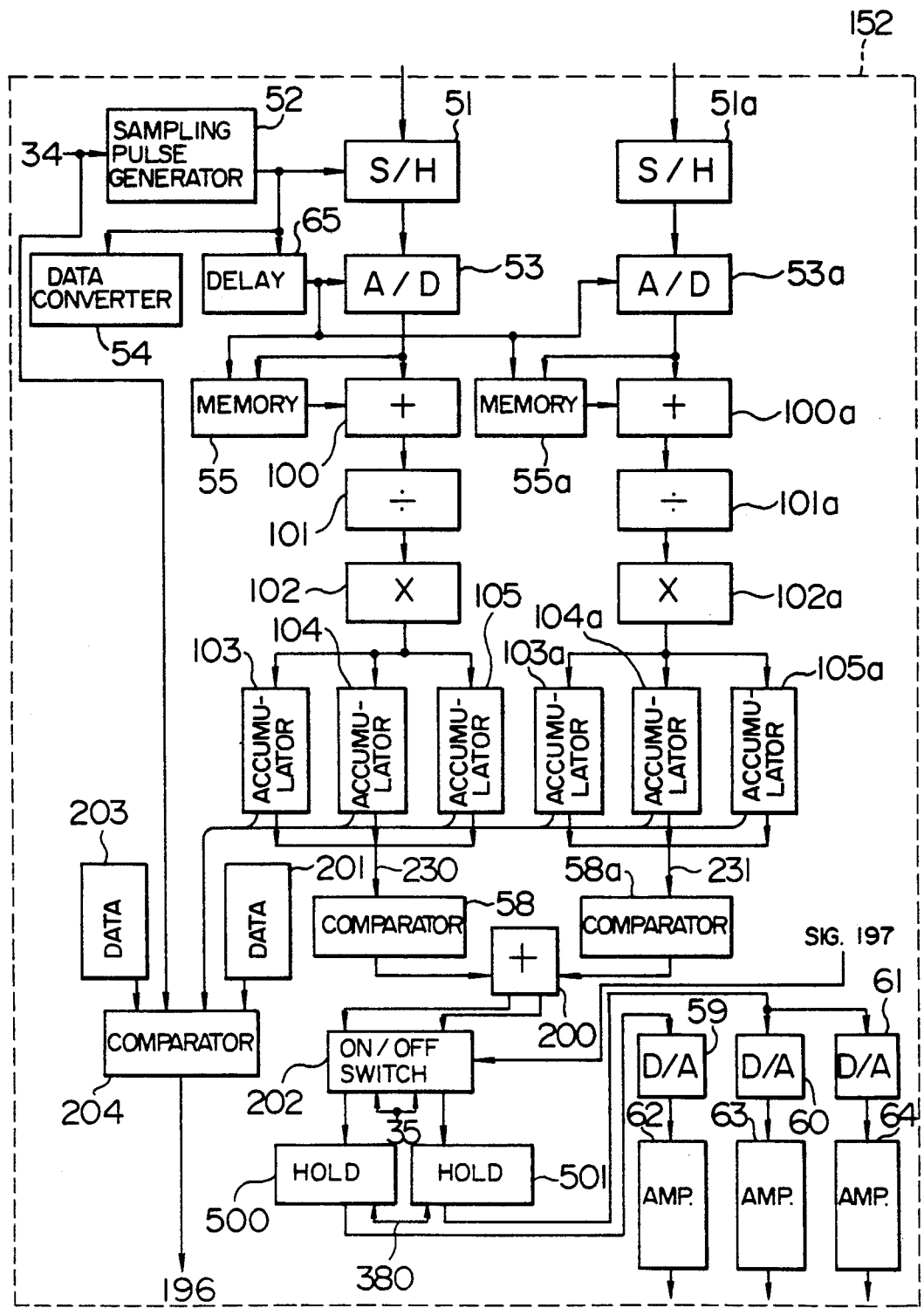
FIGS. 9, 10, 14, and 15 are block diagrams showing examples of component elements of the embodiment of FIG. 8.

In FIG. 9, reference numeral 200 denotes an adder; 201 and 203 data output devices storing the threshold level of the time-integration value of the reproduction signal within a third part a single trace period and the threshold level of the difference between the reproduced levels in the adjacent trace periods; 202 an on/off switch; and 204 a data comparator. FIG. 9 relates to a developed construction of the embodiment of FIG. 6. A developed construction of FIG. 3 is also similarly considered. In FIG. 9, the same parts and components as those shown in FIG. 6 are designated by the same reference numerals. However, parts and components designated by reference numerals to which "a" is added show another set of block which executes operations similar to those of the block constructed by the parts and components designated by the same reference numerals without "a". The output signals 32 and 33 from the heads 2 and 3 are subjected to a series of processes and are transmitted through comparators 58 and 58a, so that signals to change the tension are derived. The above signals are added by the adder 200 and transmitted through the change-over switch 202, so that signals 191 to 193 for tension control are generated in a manner similar to the above. A signal 197 is generated from the timing controller 153. At a timing to hold the tension control output to a predetermined value, the on/off switch 202 is turned off by the signal 197, thereby stopping the tension increasing operation. The data comparator 204 discriminates whether the values of the data $\Sigma_1$, $\Sigma_2$, and $\Sigma_3$ of the front, middle, and rear parts of the tracing interval are larger than a predetermined value 232 for the head tracing period of time or not. The comparator 204 also discriminates whether the differences among the data $\Sigma_1$, $\Sigma_2$, and $\Sigma_3$ are smaller than data 233 or not. Thus, the comparator 204 generates the signal 196 indicating that the tension is set to a predetermined value. That is, when the measured data is larger than the predetermined value and the differences are small, this means that the sufficient reproduction signals have been obtained. An effect by the tension control is obtained. The components 153 to 156a in FIG. 8 will now be practically explained with reference to a detailed block diagram.

Figure 10:
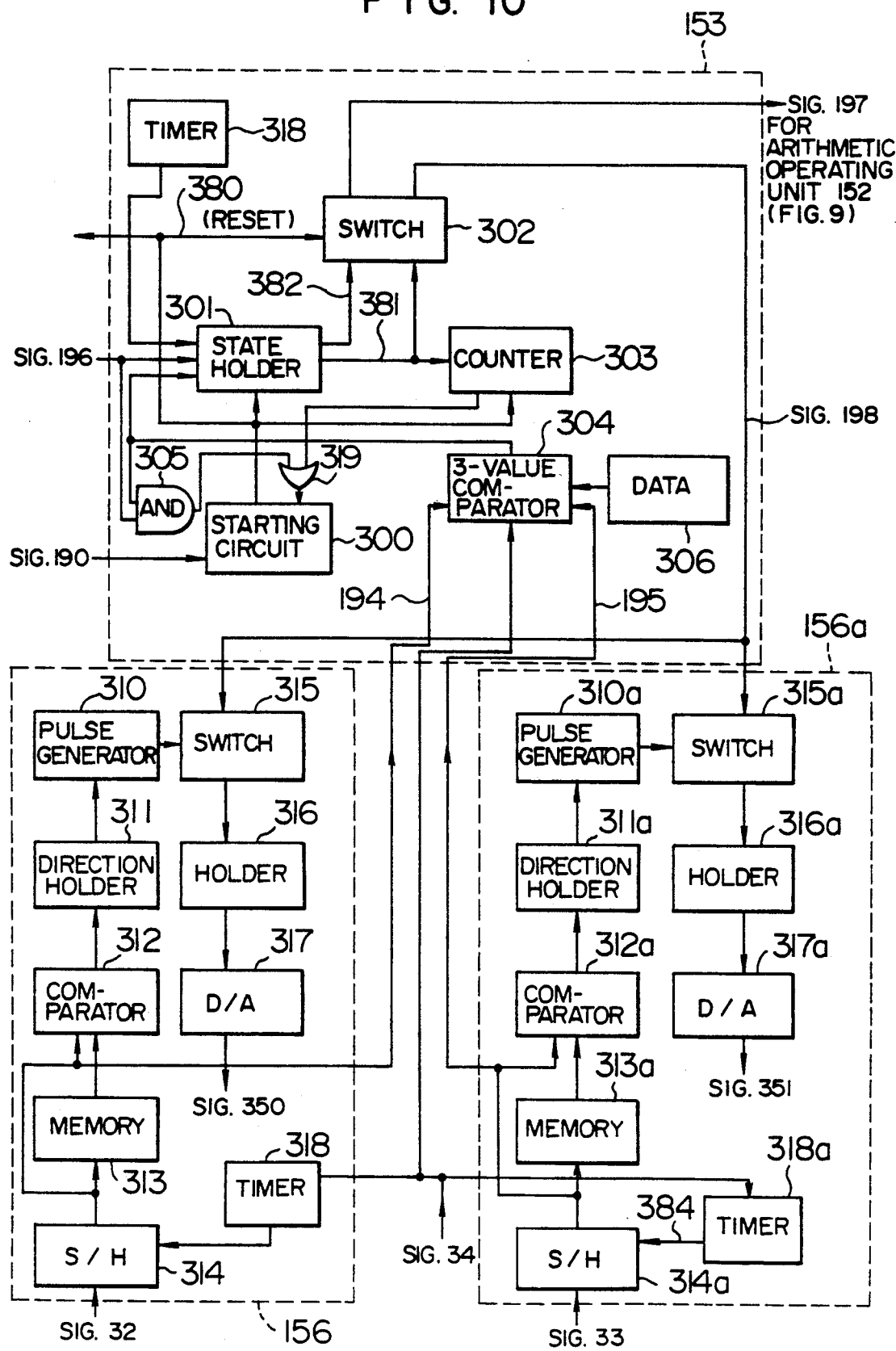
Figure 11:
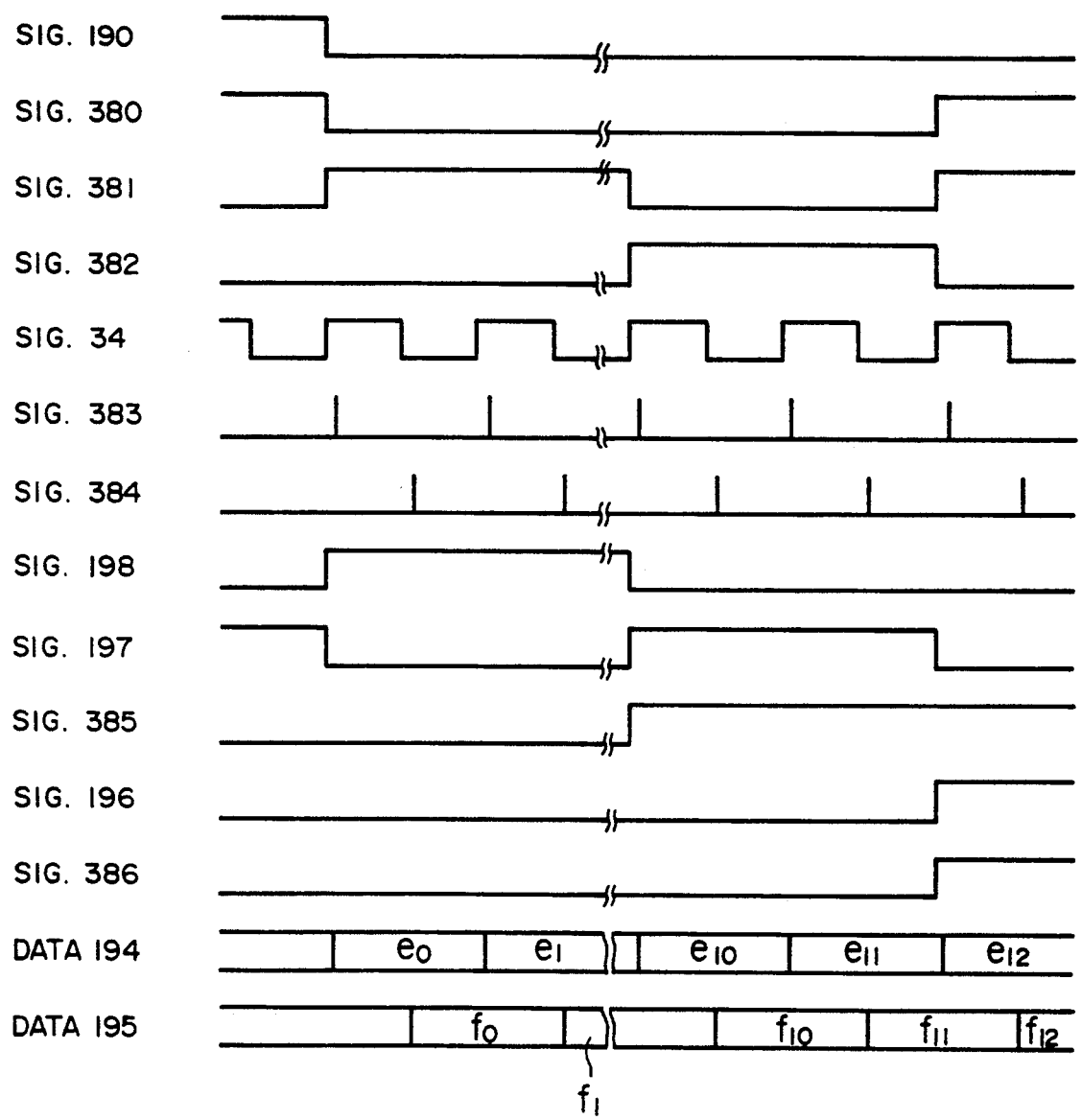
FIGS. 11 to 13 are operation explanatory diagrams of the embodiment of FIG. 8.

FIG. 10 is a detailed block diagram of the components 153, 156, and 156a. In the diagram, reference numeral 300 denotes a starting circuit; 301 a state holder; 302 a change-over switch; 303 a counter; 304 a three-value comparator; 305 an AND circuit; 306 a data output device; 310 and 310a pulse generators; 311 and 311a direction holders; 312 and 312a comparators; 313 and 313a memories; 314 and 314a sample and hold (S/H) circuits and A/D converters; 315 and 315a on/off circuits; 316 and 316a data holders; 317 and 317a D/A converters; 318 and 318a timers; and 319 an OR circuit. The operation will now be described hereinbelow with reference to FIG. 11 showing waveforms in a main section. When the start command signal 190 is supplied to the starting circuit 300, the starting circuit makes the state holder 301, change-over switch 302, and counter 303 operative. Output signals 381 and 382 of the state holder 301 have opposite polarities. When the signal 381 is set to the high level, the signal 382 is set to the low level. The switch 302 is controlled by the signal 380. When the signal 380 is at the low level, the switch 302 is made conductive, so that the signals 381 and 382 are directly supplied as signals 198 and 197 to the automatic tracking controllers 156 and 156a and the arithmetic operating unit 152 (FIG. 9). Thus, the signal 198 is set to the high level, the signal 197 is set to the low level, the on/off controllers 315 and 315a in the automatic tracking controllers 156 and 156a are turned on, the change-over switch 202 in the arithmetic operating unit 152 is turned off, thereby setting a mode in which a predetermined data output (output of the data output device 201) is D/A converted and generated. Now, the automatic tracking controllers 156 and 156a are deactivated and the tension control system in the arithmetic operating unit 152 is inactivated. The detailed operations in the automatic tracking controllers 156 and 156a will be explained herein later. The operation of the timing controller 153 will be first described. When the sufficient reproduction signals 32 and 33 are generated by the automatic tracking controls, the data 194 and 195 from the automatic tracking circuits 156 and 156a are always larger than the data of a predetermined threshold level stored in the data output device 306 during the tracing periods of the heads 2 and 3. An output signal 385 of the data comparator 304 is set to the high level, thereby instructing to stop the automatic tracking operating mode. The output signal of the state holder 301 is inverted, so that the signal 381 is set from the high level to the low level and the signal 382 is set from the low level to the high level. Thus, the on/off circuits 315 and 315a are turned off, the automatic tracking operation is stopped, and the operating mode is set into the foregoing tape tension control mode. When the signal 196 is changed from the low level to the high level after completion of the above operations, an output signal of the AND gate 305 is also changed to the high level, an output (signal 386) of the OR gate 319 is set to the high level, and the operations are completed. The output signal 380 of the starting circuit 300 is set to the high level and the operation is stopped.

Upon control of the tape tension, there is a case where the tracking point is slightly deviated because a tape path slightly changes or the contact state between the heads and the tape also changes. In such a case, the automatic tracking operation is restarted, thereby again adjusting the tracking point in the following manner. That is, if a tracking error occurs, the output signal 196 of the data comparator 204 is set to the low level and the output signal of the AND gate 305 is set to the low level. Therefore, the stop signal 386 (output of the OR gate 319) which is supplied to the starting circuit is held at the low level. However, the output of the state holder 301 is inverted by the change in signal 196 and the levels of the signals 381 and 382 are inverted. As mentioned above, the automatic tracking operation is again executed. Although the above operation is ordinarily soon completed, the operation becomes unstable when the heads are choked or when an unrecorded tape is reproduced. Therefore, the maximum time of each operation is set by the timer 318 and the counter 303 is provided. When the number of mode shifting times of the automatic tracking and the tension change exceeds a predetermined value, an operation stop signal is automatically supplied to the starting circuit 300 through the OR gate 319. The operations of the automatic tracking controllers 156 and 156a will now be described.

First, the reproduction signals 32 and 33 are converted into the digital signals by the S/H circuit and A/D converters 314 and 314a at timings which are synchronized with output pulses (signals 383 and 384) of the pulse generators 318 and 318a in a manner similar to the foregoing example. Subsequently, the converted digital data is temporarily stored into the memories 313 and 313a and also compared with the sampling data in the preceding tracing period by the comparators 312 and 312a. (For instance, those data are compared such that $e_0$ and $e_1$ and $e_1$ and $e_2$ of the data 194 or $f_0$ and $f_1$ and $f_1$ and $f_2$ of the data 195.) It is now assumed that the present data is set to $D_n$ and the preceding data which has been sampled by the preceding tracking amount is set to $D_0$. The comparators 312 and 312a generate signals in a manner such that output signals of direction holders 311 and 311a are not changed when $D_n = D_0$ and that they are inverted when $D_n < D_0$. The pulse generators 310 and 310a are controlled so as to generate pulses in a manner such that the count-up operation is performed when the output signals of the direction holders 311 and 311a are at the high level and that the count-down operation is executed when they are at the low level (those count-up/down operations can be also reversed). Upon reception of the pulse signals, the data holders 316 and 316a count up or down the count values and hold the resultant count values. Output signals of the data holders 316 and 316a are supplied to the D/A converters 317 and 317a and are converted into the analog values, so that signals 350 and 351 are generated. A feedback control functions so as to increase amplitudes of the reproduction signals 32 and 33 by giving the output signals 350 and 351 (or after they were amplified) to the head moving mechanisms. Since the tracking data is held in the data holders 316 and 316a, the automatic tracking operation can be also turned on or off by turning on or off the count-up or count-down pulse.

Figure 12:
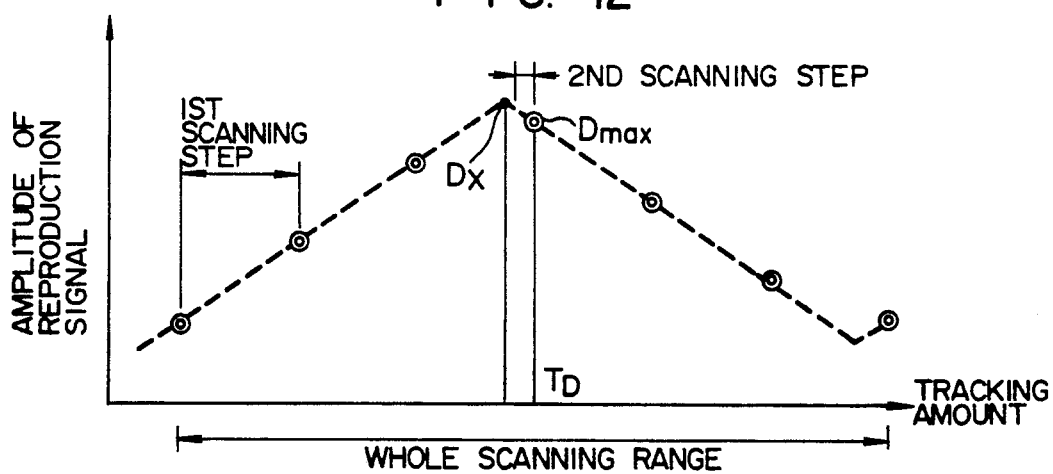
Figure 13:
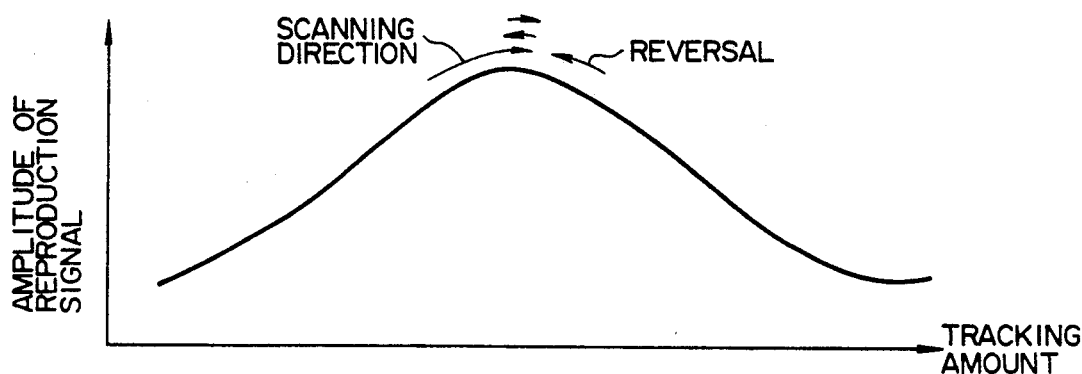
Figure 14:
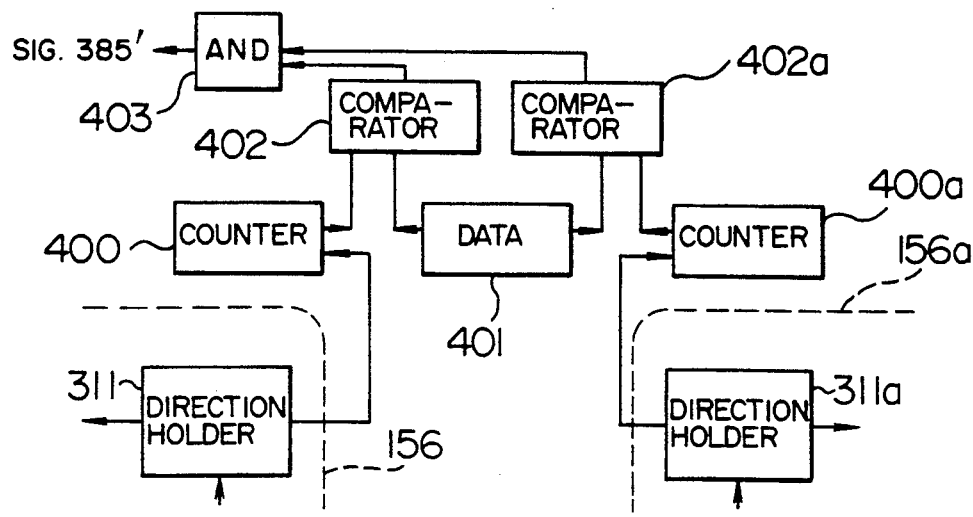
Figure 15:
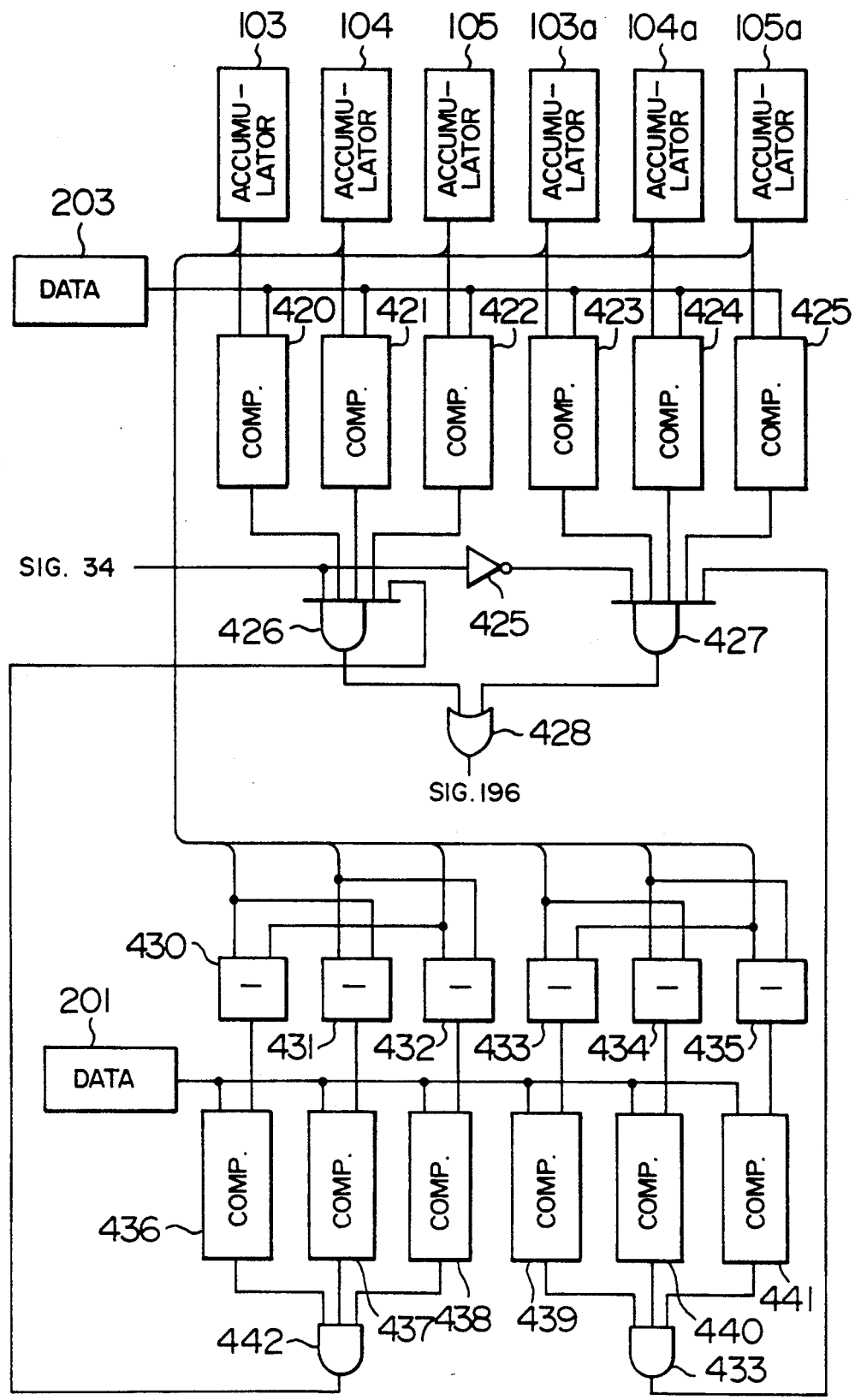

In the above example, the A/D converters of the reproduction signals, the sample and hold circuits, the pulse generators, and the memories have been provided for the arithmetic operating unit 152 and for the automatic tracking controllers 156 and 156a, respectively. However, in many cases, there is no need to change the sampling points of the reproduction signals for, particularly, the tracking and the tension measurement. Therefore, they can be sufficiently commonly constructed. In addition, although the data output devices, the data comparators, and the like have also individually provided for the timing controller 153 and the arithmetic operating unit 152, they can be also commonly constructed. Although the data output 306 of a predetermined value has been used as comparison data of the data comparator 304, such an output can be also obtained as follows. That is, the whole range of the tracking such is coarsely divided and the track is coarsely scanned upon actuation of the automatic tracking. Data ($D_{mos}$ in FIG. 12) and a tracking amount ($T_D$) when the tracking amount becomes maximum are stored. Then, the portion near the maximum tracking amount is scanned by fine steps. At this time, a maximum amplitude value ($D_x$) is predicted from the data of the tracking amount and the reproduction signals and is used as output data of the data output device 306. The following method is also considered as a method of detecting the completion of the automatic tracking. That is, in the above tracking scan, since there are executed the operations to search a point of the maximum amplitude of the reproduction signals while changing the tracking amount, the scanning direction is reversed at the point of the maximum reproduction signal amplitude (FIG. 13). Therefore, by counting the number of such reversing times and by detecting that the count value has exceeded a predetermined value, a resultant detection signal is used as an automatic tracking completion signal. FIG. 14 shows a practical construction in such a case. In the diagram, reference numerals 400 and 400a denote counters; 401 a data output device storing the number of reversals of the moving direction at a point of the maximum level; 402 and 402a comparators; and 403 an AND circuit. The direction holders 311 and 311a in the automatic tracking controllers 156 and 156a in FIG. 10 hold the automatic tracking scanning directions. Therefore, the numbers of reversing times m and ma are counted by the counters 400 and 400a. The comparators 402 and 402a compare the count values and an output l of the data output device 401. When m>l and ma>l, the comparators invert output signal levels to the high level. Thus, the AND circuit 403 calculates the AND of both of the high level signals of the comparators and generates a signal 385'. When the signal 385' is changed from the low level to the high level, this means that the automatic tracking controllers 156 and 156a have searched the tracking amounts corresponding to the maximum reproduction signals for the heads 2 and 3, respectively. A practical construction example of the data comparator 204 will now be finally explained in the embodiment. In FIG. 15, reference numerals 420 to 425 and 430 to 441 denote comparators; 425 an inverter; 426, 427, 442, and 443 AND gates; and 428 an OR gate. The operation will now be described. The outputs $\Sigma_1$, $\Sigma_2$, and $\Sigma_3$ from the accumulators 103 to 105 are compared with the output data of the data output device 203 by the comparators 420 to 425. It is now assumed that the output data of the accumulators 103 to 105 are set to g and the output data of the data output device 203 is set to h. When g>h, the comparators 420 to 425 generate high level signals. Comparators 430 to 435 calculate differences between and $\Sigma_1$, between $\Sigma_2$ and $\Sigma_3$, and between $\Sigma_3$ and $\Sigma_1$. Assuming that the differences are set to $S_1$, $S_2$, and $S_3$, comparators 436 to 441 compare $S_1$, $S_2$, and $S_3$ with the output data k from the data output device 201 and generate high level signals when $S_1 < k$, $S_2 < k$, and $S_3 < k$. Output signals of the AND gates 442 and 443 are eventually set to the high level when the differences among $\Sigma_1$, $\Sigma_2$, and $\Sigma_3$ are Small. Since the signal 34 indicates which one of the rotary heads 2 and 3 is tracing, the data of the head which is tracing is selected by the AND gates 426 and 427. The OR of output signals of the AND gates 426 and 427 is calculated by the OR gate 428, so that the signal 196 is finally obtained.

The invention can be embodied as mentioned above. Although all of the controls have been constructed by the hardwares in the above embodiment, they can be also performed by using a microprocessor. According to the invention, since many arithmetic operating processes are included and the control frequency is also low, it is proper to execute the processes by a microprocessor. A processing flowchart in the case of realizing the processes in FIG. 9 by a microprocessor is shown in FIG. 16 as an example. The flowchart doesn't describe the automatic tracking control but relates to an example in which only the tape tension control is performed. In the diagram, NDATA, ODATA, Nn, Z, F, M, E, h, $\tau_S$, $\tau_T$, $\Delta$, and the like denote data storage variables.

Lastly, in the unrecorded portion and noise portion, the foregoing tape tension control is stopped as follows. That is, a signal which is set to the low level when no reproduction signal is obtained for a predetermined period and which is set to the high level when the reproduction signals are obtained is derived. When such signal is set to the low level, the data in the data holders in FIGS. 3, 6, and 9 is set into a holding state.

As mentioned above, according to the invention, there are effects such that a drop-out of the levels of the reproduction signals which has conventionally occurred due to a difference of the tapes which are reproduced is automatically detected and the tape tension is properly corrected, so that the signals are reproduced always in a good state.

An embodiment of a magnetic recording signal reproducing apparatus of the digital recording system having a reproduction noise reducing apparatus in the case of reproducing at a tape speed different from a recording speed according to the invention will now be described with reference to the drawings. In the embodiment, the foregoing tape tension control and the head movement control can be used together or can be solely used.

Figure 17A:
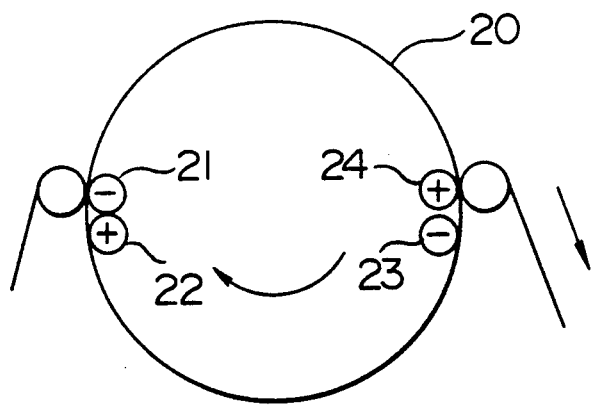
FIGS. 17A to 17C, 18A, and 18B are explanatory diagrams of the digital recording and reproduction of the D-2 system.
Figure 17B:
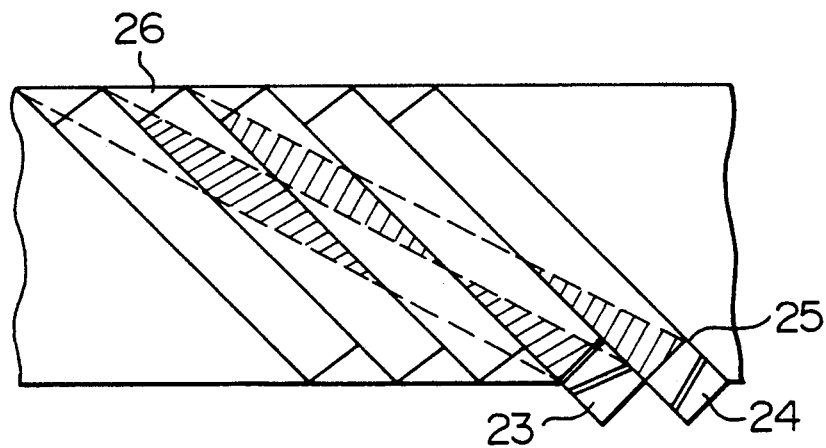
Figure 17C:
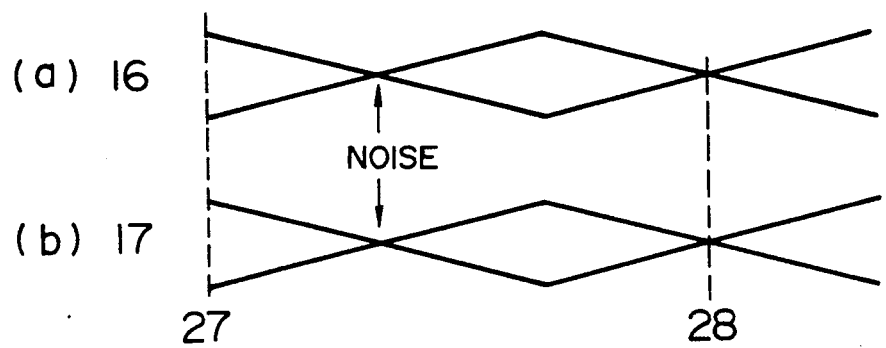
Figure 18A:
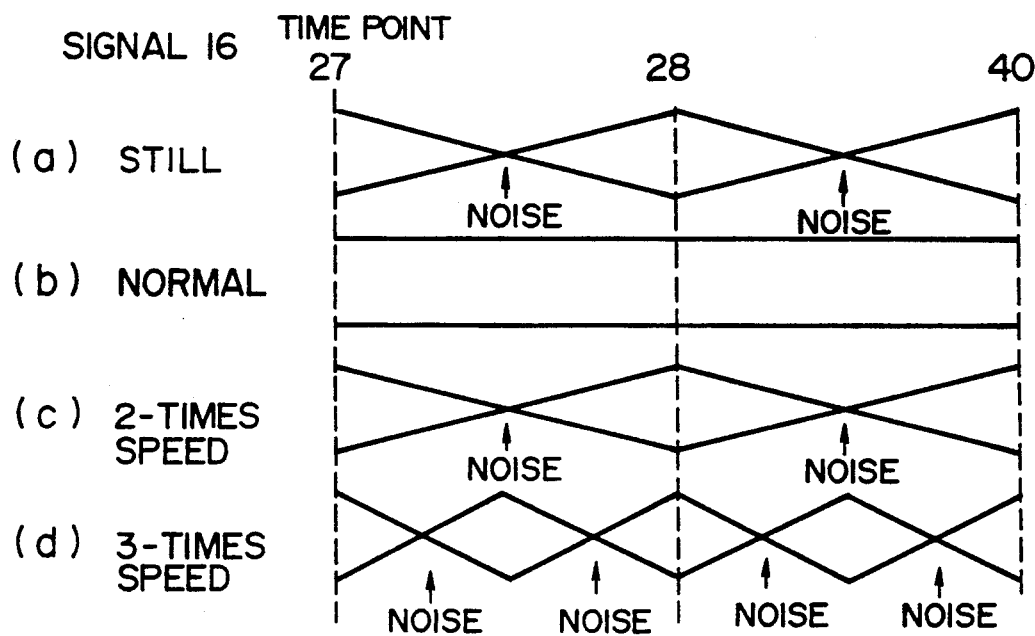
Figure 18B:
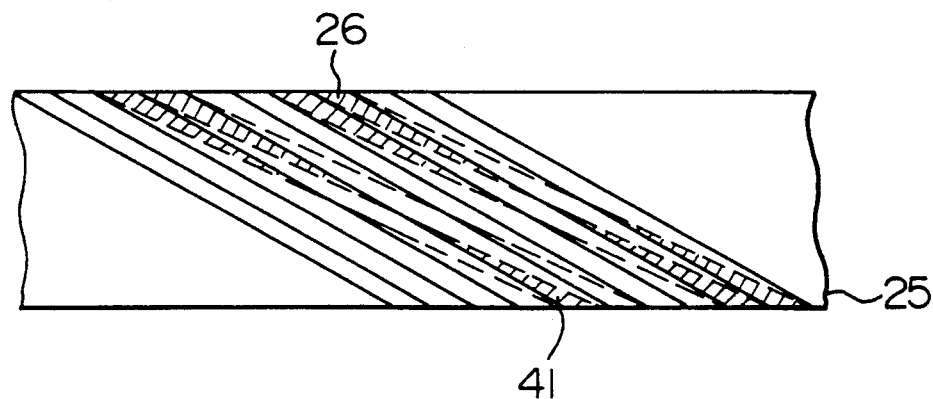

The operation of the magnetic recording signal reproducing apparatus of the D-2 system as one of the digital recording systems will now be explained. FIG. 17A is a schematic diagram showing components around a cylinder of the reproducing apparatus. In FIG. 17A, reference numeral 20 denotes a rotary cylinder; 21 to 24 rotary heads; 25 and 26 edge points; 27 and 28 time points; and 16 and 17 reproduction signals. In the system of the embodiment, as shown in FIG. 17B, signals are simultaneously recorded onto two tracks by the two heads 23 and 24 or by the two heads 21 and 22, while the recorded signals are also simultaneously reproduced from two tracks by those heads. Such a construction is needed to realize the recording and reproduction of the digital data of an amount which has been extremely increased due to the digitization as compared with that of the analog recording. In the actual apparatus, the video data is divided into three data corresponding to the upper, middle, and lower regions of the screen and one screen is constructed by three tracing operations. When considering the case of tracing from the lower edge point 25 to the upper edge point 26 of the track, the two signals which are reproduced by the heads 23 and 24 change in a manner similar to the signals 16 and 17 in FIG. 17C. Although the case of a reproducing speed which is 2.5 times as high as the normal speed has been considered here, the cases of several reproducing speeds which are integer times as high as the normal speed will now be considered. FIG. 18A shows examples of level changes of the reproduction signals which are generated from the heads 23 and 21 in the cases of several reproducing speeds which are integer times as high as the normal speed. From the above circumstances, the head 23 in FIG. 17A traces the tracks from the lower edge point 25 to the upper edge point 26 of the tape. After the reproduction signals changed from the time point 27 to the time point 28 as shown in the diagram, a pair of heads 21 and 22 which face each other have already reached a lower edge 41 of the tape shown in FIG. 18B and trace the tracks on the tape while drawing a similar pattern. Therefore, reproduction signals of repetitive patterns as shown in (a), (c), and (d) in FIG. 18A are derived. In the case of the digital system, the data in a predetermined address on the screen is always read out from and written into a predetermined location on the tape. Therefore, when the reproduction signal at a predetermined location is not derived as shown in FIG. 18A, this means that fixed noises are always left on the screen. Further, a reproduction image which is obtained by the digital system is read out of the tape and is stored into memories and is constructed by the data which is read out of the memories. Errors are corrected by using the data close to the present data. Consequently, the picture quality is not so lost by the random noises. However, in the case where data of a predetermined address section is not always derived, the fixed noise pattern is always left on the screen as the same pattern, so that the reproduction image is very hard to see. In the conventional analog system, the number of noises on the screen is reduced. On the other hand, in the digital system, the noises are distributed to different addresses.

Figure 19:
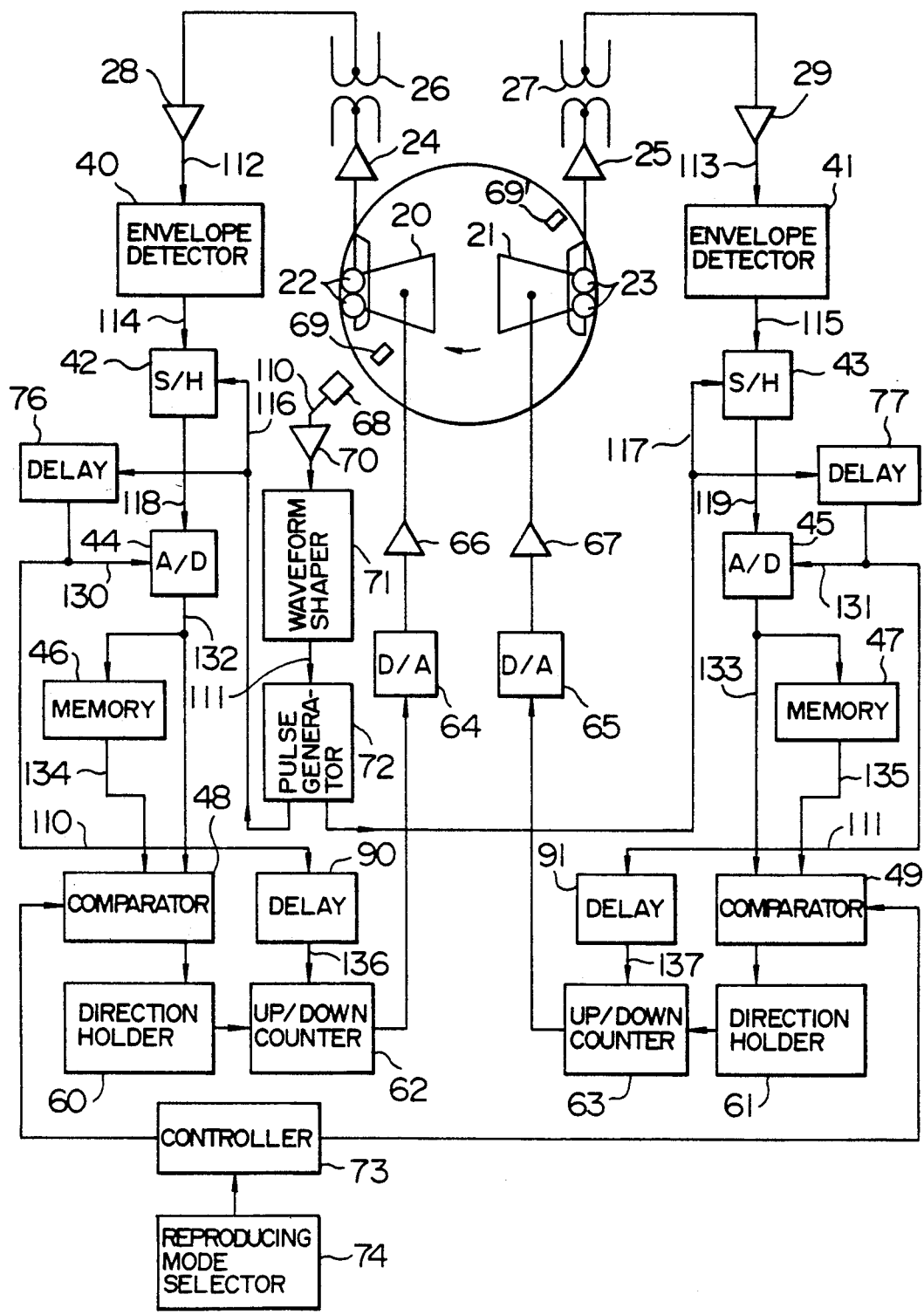
FIG. 19 is a block diagram of an embodiment of the invention.
Figure 20:
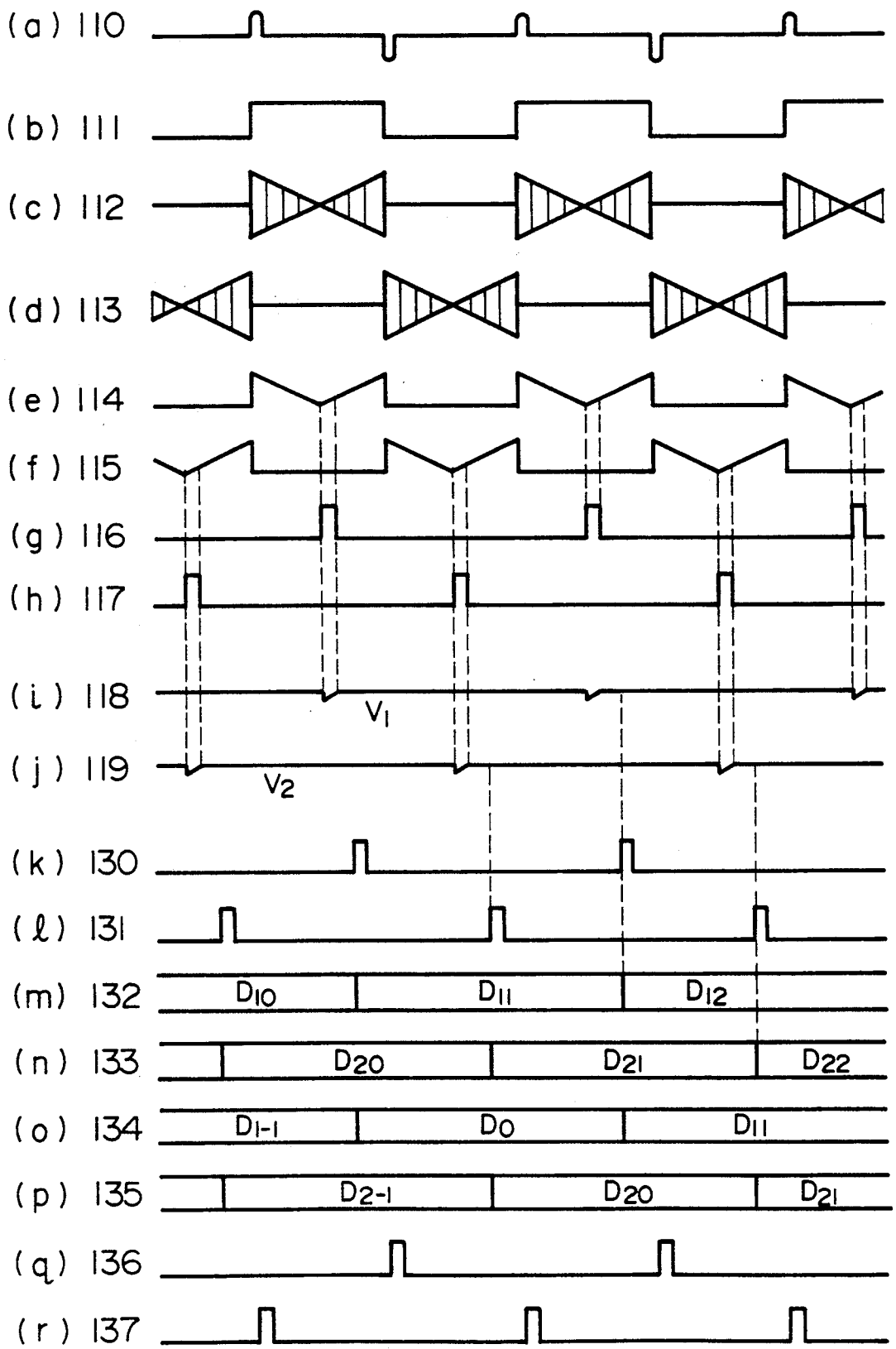
FIG. 20 is a waveform diagram of a main section corresponding to the embodiment of FIG. 19.

An embodiment of the invention will now be described hereinbelow with reference to a block diagram of FIG. 19. In the diagram, reference numerals 22 and 23 denote reproducing heads; 20 and 21 actuators to which the reproduction heads are attached and which can move the reproducing heads in the vertical direction (hereinafter, referred to as a height direction) perpendicular to the head rotational surface; 24 and 25 amplifiers to amplify reproduction signals derived from the reproducing heads; 26 and 27 rotary transformers which are provided to extract the signals from the rotating reproducing heads in a contactless manner; 28 and 29 amplifiers; 40 and 41 envelope detectors; 42 and 43 sample and hold (S/H) circuits; 44 and 45 analog-digital (A/D) converters; 46 and 47 memories; 48 and 49 comparators (arithmetic operating units); 60 and 61 direction holders; 62 and 63 up/down counters; 64 and 65 digital-analog (D/A) converters; 66 and 67 amplifiers; 68 a rotation detector; 69 and 69' rotary oscillators which are realized by magnets or the like which are buried in a cylinder to which the rotary heads are attached; 70 an amplifier; 71 a waveform shaper; 72 a sampling pulse generator; 73 a controller; 74 reproducing mode switch; and 76, 77, 90, and 91 delay circuits. The operation will now be described hereinafter with reference to a waveform diagram of a main section of FIG. 20 corresponding to the block diagram of FIG. 19.

Figure 21A:
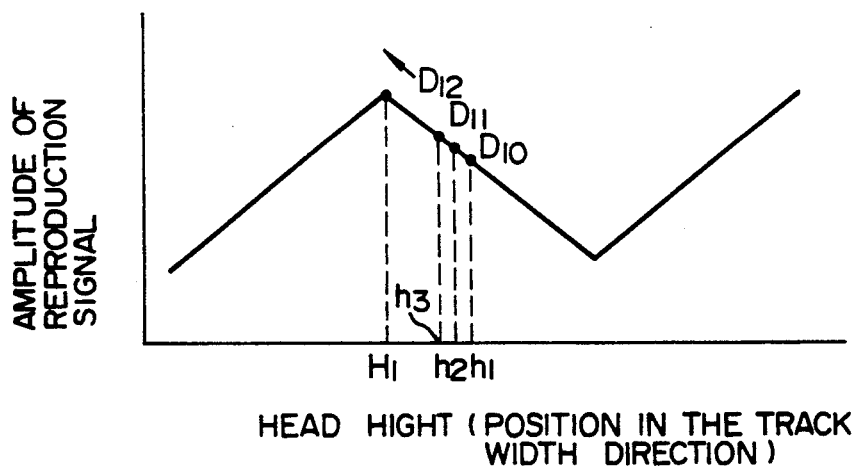
Figure 21B:
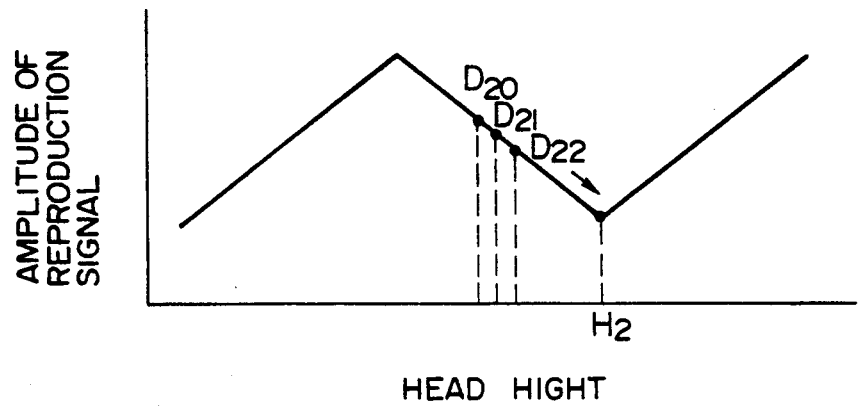
Figure 21C:
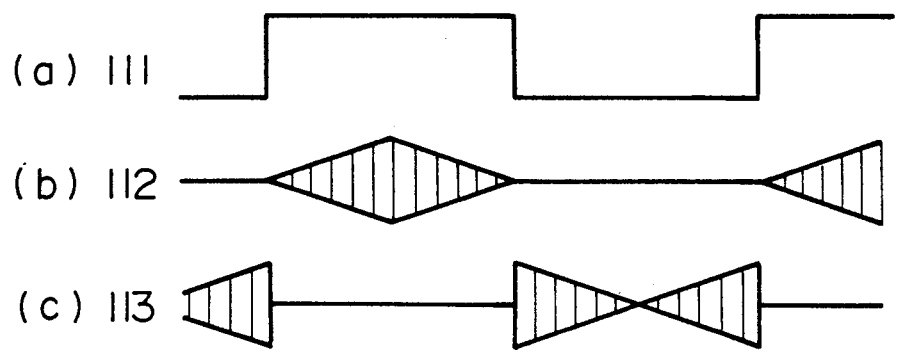

The magnets 69 and 69' attached on the cylinder having the rotary heads 22 and 23 have opposite polarities and are arranged onto the cylinder so as to be away from each other by an angle of 180°. In association with the rotation of the cylinder, passages of the magnets 69 and 69' are detected by the rotation detector 68 which is realized by a Hall element or the like. A pulse-like waveform 110 is obtained each time the cylinder rotates by a half circumference. The signal 110 is amplified by the amplifier 70 and is waveform-shaped by the waveform shaper 71, so that a rectangular waveform 111 is obtained. The rectangular waveform 111 is used as a switching signal of the rotary heads. On the other hand, reproduction signals 112 and 113 extracted by the rotary transformers 26 and 27 are detected by the envelope detectors 40 and 41, so that signals 114 and 115 are derived therefrom. The signals 114 and 115 are further sampled circuits 42 and 43. The sampling and holding timings are determined by signals 116 and 117 which are decided from the head switching signal 111. Further, sampled and held signals 118 and 119 are converted into digital values at timings of signals 130 and 131 which are slightly delayed by the delay circuits 76 and 77 from the completion of the sampling and holding operations. The above converting processes are executed by the A/D converters 44 and 45, so that time sequence data of ..., $D_{10}, D_{11}, D_{12}, \ldots$ (signal 132) and time Sequence data of ..., $D_{20}, D_{21}, D_{22}, \ldots$ (signal 133) are obtained every channel. Those data are time-shifted by the memories 46 and 47 and become time sequence data of ..., $D_{11}, D_{10}, D_{11}, \ldots$ (signal 134) and time Sequence data of ..., $D_{2-1}, D_{20}, D_{21}, \ldots$ (signal 135). Among the height of the head, the height of the head at one point on the screen, that is, at a predetermined track position from the edge of the head switching signal 111., and the amplitude of the reproduction signal, there are relations showing almost mountain-like curves as shown in FIGS. 21A and 21B. Therefore, the head height is stored into the up/down counter and the amplitude of the reproduction signal is compared with the preceding amplitude while changing the head height, so that it is possible to climb up or down the mountain. A process to climb up the mountain will now be explained hereinbelow. First, it is assumed that a head height $h_1$ has been stored in the up/down counter 62. A predetermined clock signal 136 is then supplied to the up/down counter. Direction information indicating whether the counter is counted up or down has previously been held in the direction holder 60. The held direction is reversed in accordance with the result of the comparison of the comparator 48. For instance, the direction is reversed when the new data value is smaller than the preceding data value or when the new data value is larger than the preceding data value. In the former case, the mountain is climbed up. In the latter case, the mountain is climbed down. In the case of the above example, the new data $D_{11}$ is compared with the preceding data $D_{10}$ and the direction is reversed when $D_{11} < D_{10}$. As shown in FIG. 21A, since the direction is not reversed when $D_{11} > D_{10}$, the up/down counter counts down. The count value of the counter is converted into the analog value by the D/A converter 64 and is amplified by the amplifier 66. The amplified signal is supplied to the actuator 20 to thereby reduce the height of the head 22. As a result of the above operations, the head height is changed from $h_2$ to $h_3$. The amplitude data $D_{12}$ which is reproduced at a time point when the head height has changed to $h_3$ is further larger than $D_{11}$, the direction is set to the down direction, the counting operation is continued, and the amplitude finally reaches the summit of the mountain. At a location near a head height $H_1$ at such a time point, the new data value is smaller than the preceding data value, so that the summit is reciprocated. On the other hand, in another system, that is, the system to control the head 23, a control to climb down the mountain is executed on the contrary. Thus, the head height sets the reproduction signal amplitude to the lowest level as shown at $H_2$. As a result of the above control, the reproduction signal levels at a time point when the sampling and holding process is executed (in the example, a time point when the heads trace almost the center of the track) become maximum at one channel and become minimum at the other channel as shown in FIG. 21C. Signals 112 and 113 have waveforms so as to compensate the signal levels which lack at the starting, middle, and end points of the track and do not become fixed noises on the screen.

In the normal reproducing mode, the above operation is switched to the control mode to find out a summit of the mountain by a reproducing mode switch. That is, the controller 73 controls in a manner such that in the normal reproducing mode, the direction is reversed when the new data value is smaller than the preceding data value by the comparators 48 and 49 with respect to both channels and that in a variable speed reproducing mode such as a picture searching mode, the direction is reversed when the new data value is larger than the preceding data value with regard to either one of the two channels. The fundamental operations are completed as mentioned above.

Figure 22:
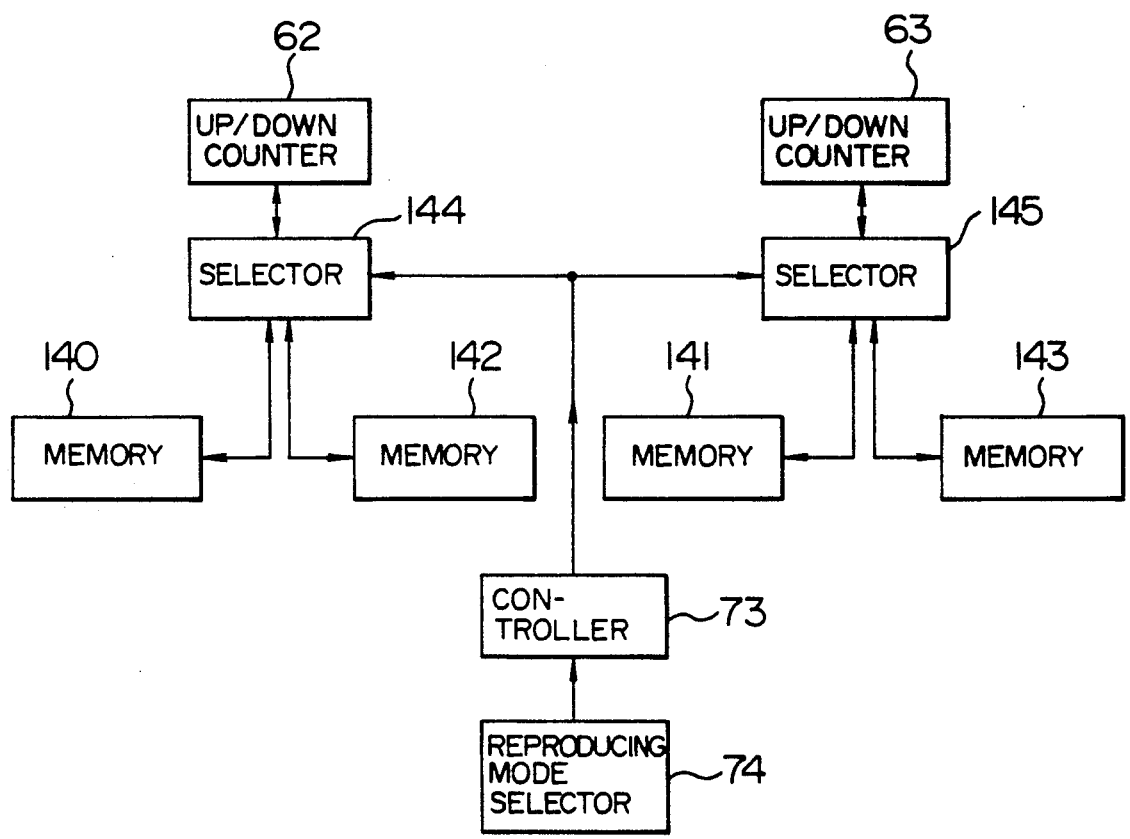
FIGS. 22, 23, 27, and 28 are block diagrams of other embodiments of the invention.

According to the above embodiment, since the tracking operation is executed every switching between the normal speed mode and the variable speed mode, such a method is unpreferable. Therefore, memories to store the data of the up/down counters every mode switching operation are provided for the normal speed reproduction and the variable speed reproduction, respectively. FIG. 22 shows a practical embodiment. In FIG. 22, reference numerals 140 to 143 denote memories and 144 and 145 indicate selectors. When data is actually stored into the digital memories, it is sufficient to access addresses in the memories. Therefore, the circuits corresponding to the selectors do not exist. However, the selectors are shown here for convenience of explanation. The memories 140 and 141 store the digital values in the normal speed reproducing mode. The memories 142 and 143 store the digital values in the variable speed reproducing mode. That is, in the normal speed reproducing mode, initial values of the up/down counters 62 and 63 are selected from the memories 140 and 141 by the selectors 144 and 145 and are extracted and used for control and are updated every time. In the variable speed reproducing mode, the initial values are likewise extracted from the memories 142 and 143 by the selectors 144 and 145 and operations similar to those mentioned above are executed. In the above case, the controller 73 and the mode switch 74 switch the control to find out the summit of the mountain and the control to find out the valley and the lower edge in accordance with the mode switching operation between the normal speed reproduction and the variable speed reproduction and also controls the selectors 144 and 145 so as to select either one of the side of the memories 140 and 141 and the side of the memories 142 and 143.

In the above embodiment, there has been provided the mode to monitor the level of the reproduction signal in the variable speed reproducing mode. However, for simplicity, the object can be also accomplished by calculating a predetermined offset amount by using the head height in the normal speed reproducing mode as a reference.

Figure 23:
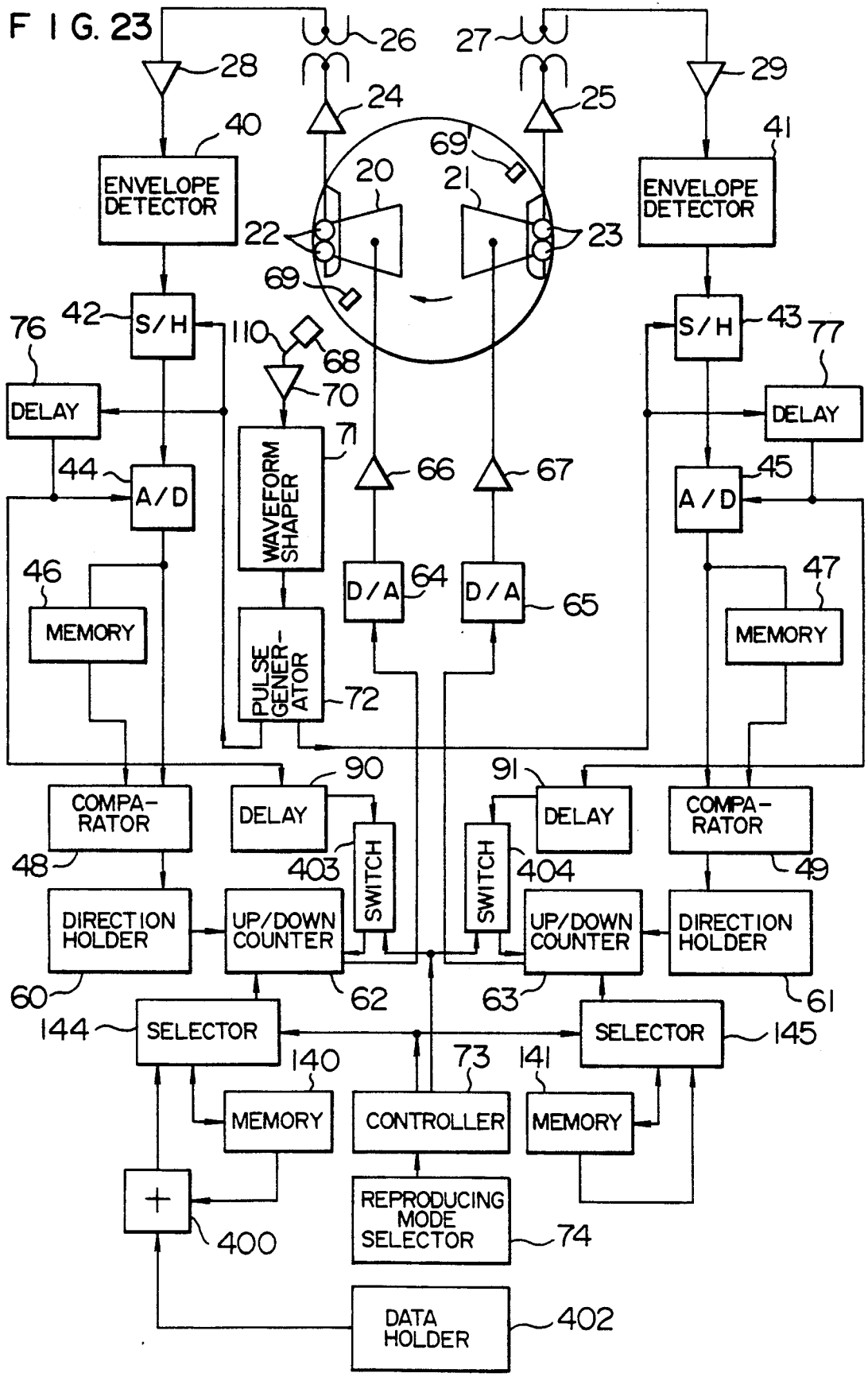
Figure 24A:
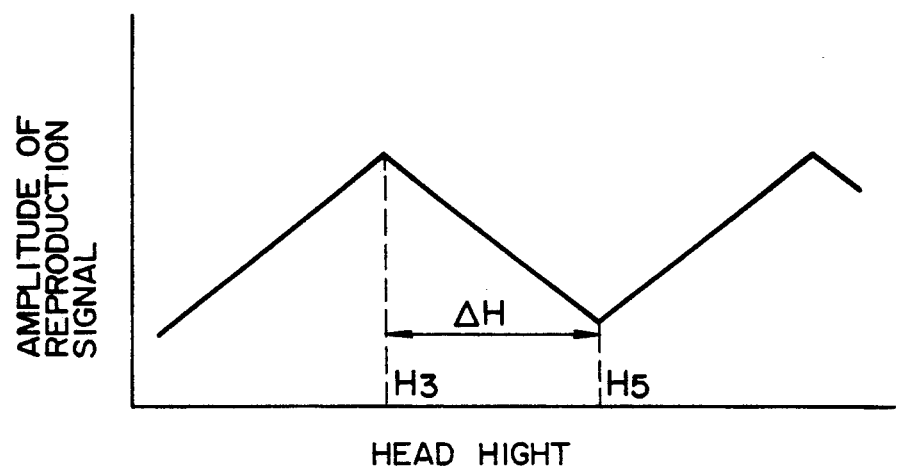
Figure 24B:
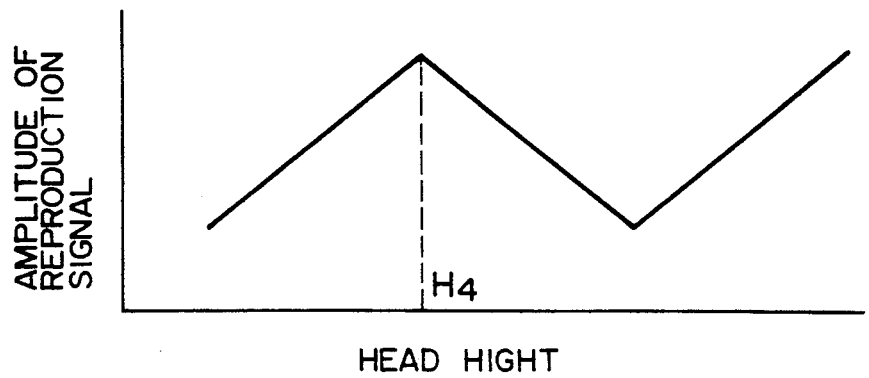

FIG. 23 shows another embodiment of the invention according to the above principle. In the diagram, the same parts and components as those shown in FIGS. 19 and 22 are designated by the same reference numerals. Reference numeral 400 denotes an adder; 402 a data holder; and 403 and 404 switches. The operation will now be explained with reference to FIGS. 24A and 24B. FIG. 24A shows the height of head 22 and the reproduction signal amplitude. FIG. 24B shows the height of head 23 and the reproduction signal amplitude. First, in the normal speed reproducing mode, the control to find out the summit of the mountain is executed in a manner similar to the embodiment shown in the block diagram of FIG. 19. In the above case, the comparators 48 and 49 have been preset so as to reverse the direction when the new data value is smaller than the preceding data value. In a manner similar to the example of the block diagram of FIG. 22, the up/down count values for the normal speed reproducing mode are stored into the memories 140 and 141. The up/down counting operations are executed when the switches 403 and 404 are turned on. Consequently, the system performs the operation to climb up the mountain and the heads 22 and 23 are moved to the heights such as to provide the maximum reproduction signals, respectively. Heights at such points are set to H3 and H4 in FIGS. 24A and 24B. The data which gives the above heights is stored into the memories 140 and 141. When the reproducing mode is now switched to the variable speed reproducing mode by the reproducing mode switch 74, the controller 73 changes the selecting states of the selectors 144 and 145 and stops the data updating operations of the memories 140 and 141 and fixes the operating mode to the reading mode. The controller 73 controls the selector 144 in a manner such that the data which is obtained by adding the output of the memory 140 and the output data of the data holding device 402 by the adder 400 is loaded into the up/down counter 62. The value which has been fixedly set in the variable speed reproducing mode is loaded into the up/down counter in the above case. The data in the data holder 402 is data enough to change the head height by $\Delta H$ in FIG. 24A. Therefore, when the operating mode is set to the variable speed reproducing mode, the heights of the heads 22 and 23 are set to $H_5$ and $H_4$ in FIGS. 24A and 24B, respectively. One of the two heads is located at the summit of the mountain and the other is located at the lower edge of the valley in a manner almost similar to the case of the foregoing embodiment. Thus, for instance, the reproduction signal at the center of the tracing region of the head is controlled as mentioned above. Therefore, the reproduction signal is set to a waveform as shown in FIG. 21A and the object is accomplished. In the embodiment, although the head height has been shifted in the high direction, it can be also shifted in the low direction by $\Delta H$. In such a case, a subtracter can be used in place of the adder 400. Further, the value of $\Delta H$ is generally set to $2n+1$ ($n = \ldots, -1, 0, 1, 2, \ldots$: integer). Any one of the heads 22 and 23 can be shifted by $\Delta H$.

Figure 26A:
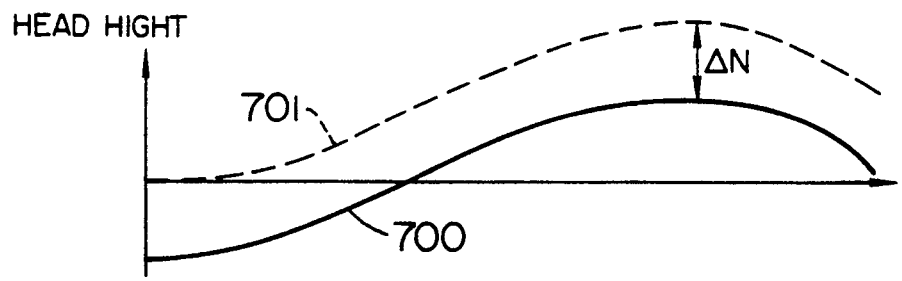
Figure 26B:
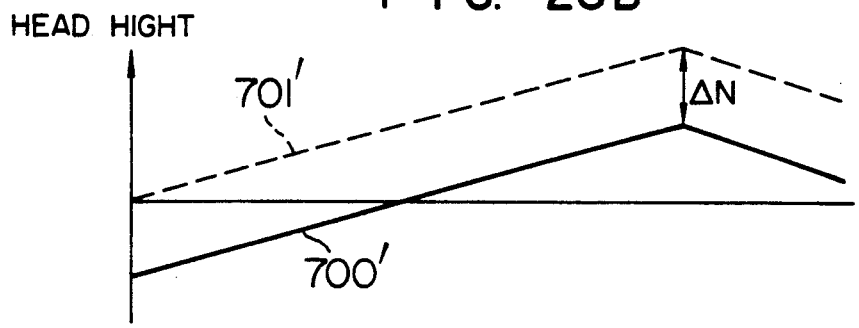

In the above example, the head height has been fixedly set to the value for the variable speed reproducing mode, in the case where a reproducing speed is close to the normal reproducing speed, it is also considered to purposely vertically swing the head height. For instance, in the case where the output signals from both of the heads are as shown in FIG. 21A, the reproduction signals have the waveforms 112' and 113'. Therefore, the reducing portions of the reproduction signal levels are located at points of ¼ and ½ (points 600 and 601 in FIG. 25A) of the tracing region. As the moving phases of the cylinder (heads) and the tape are synchronized, the reducing portions are fixed. Since the digital recording signal reproducing apparatus has a fairly high correcting capability based on the data near the present data as mentioned above; it is advantageous that the errors are distributed. For this purpose, it is considered to purposely shift the signal amplitude reducing portions as shown in FIGS. 25B and 25C. For example, the head heights are changed as shown in FIGS. 26A and 26B. Although the waveforms of the sine wave and triangular wave have been considered here, the height heights can be also changed by various time functions. An embodiment is shown below and the operation will now be described.

Figure 27:
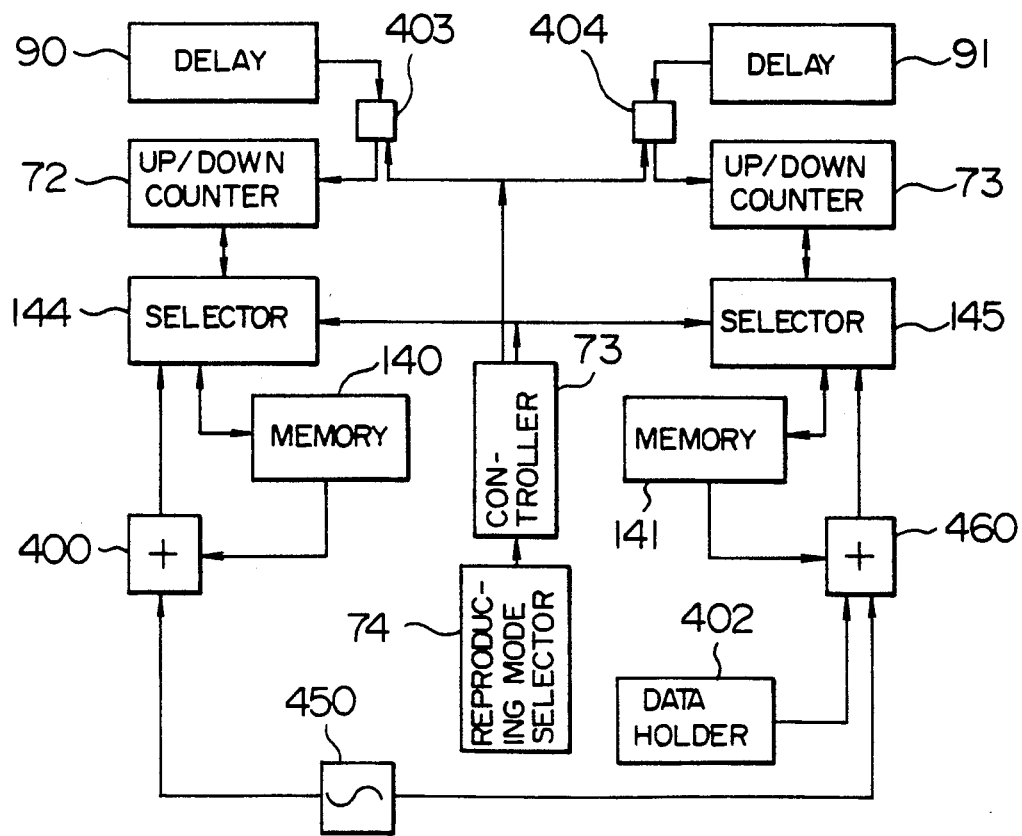

FIG. 27 is a block diagram of a practical embodiment based on the above purpose. In the diagram, reference numeral 450 denotes a data generator and 460 indicates an adder. In the normal reproducing mode, the control to find out the summit of the mountain is performed to both channels of the heads 22 and 23 in a manner similar to the foregoing embodiment. There is a troublesomeness in the variable speed reproducing mode. In such a mode, the data generator 450 generates digital data which fluctuates with the elapse of time. Further, the output of a data converter 451, the output data of the data holder 402, and the output of the memory 141 are added by the adder 460. The addition data is converted into digital values which cause changes as shown by, for example, reference numerals 701 and 701' in FIGS. 26A and 26B. FIGS. 26A and 26B show that one head (700 or 701) is moved and while another head (700' or 701') is moved simultaneously. The digital value shown by $\Delta N$ is the data which is held in the data holder 402 and is the data such as to cause a difference of the head height of $\Delta H$ in FIG. 24A as mentioned above. Thus, the reproduction signals which change as shown in FIGS. 25A, 25B, and 25C are derived.

Figure 28:
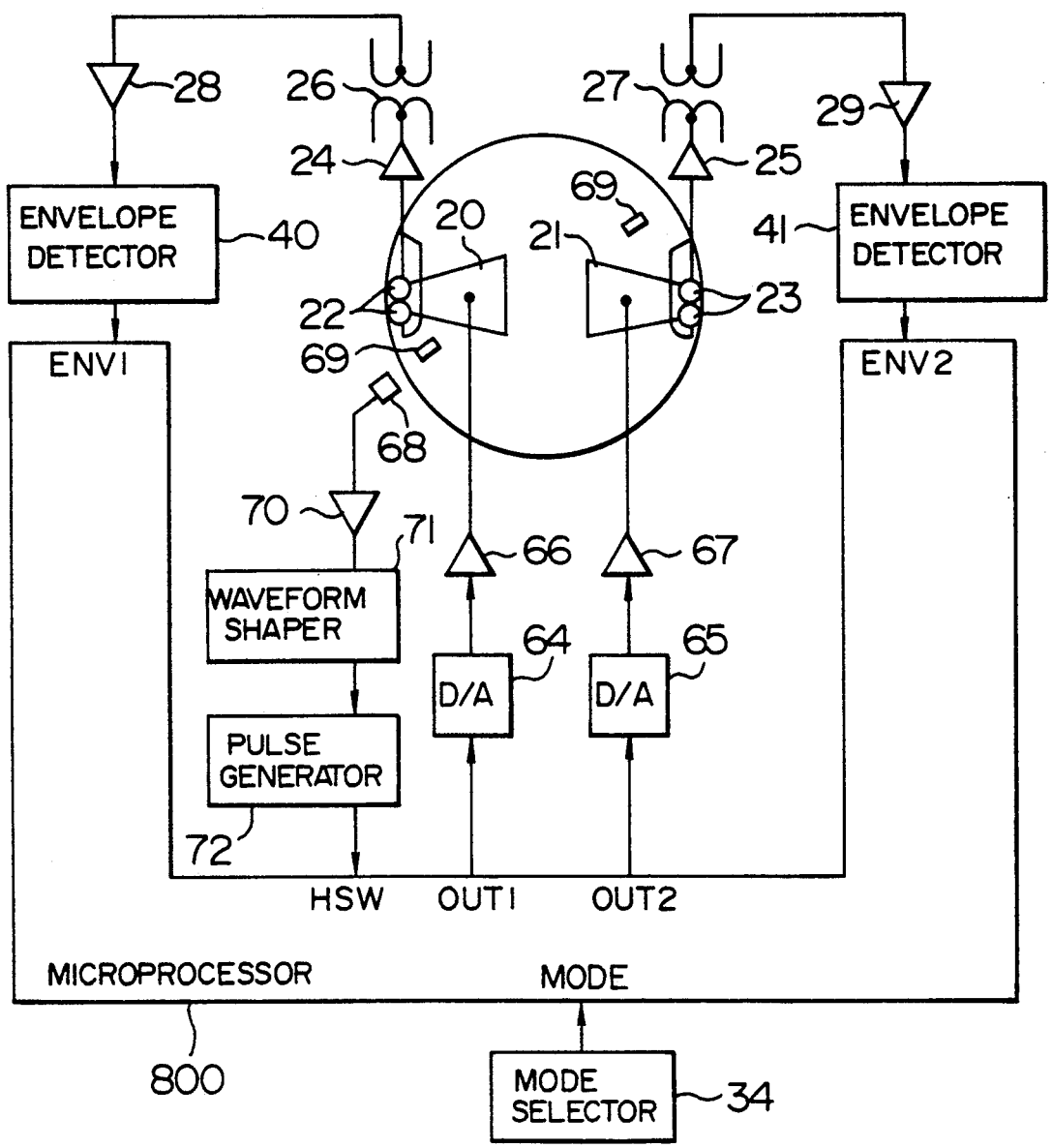
Figure 29:
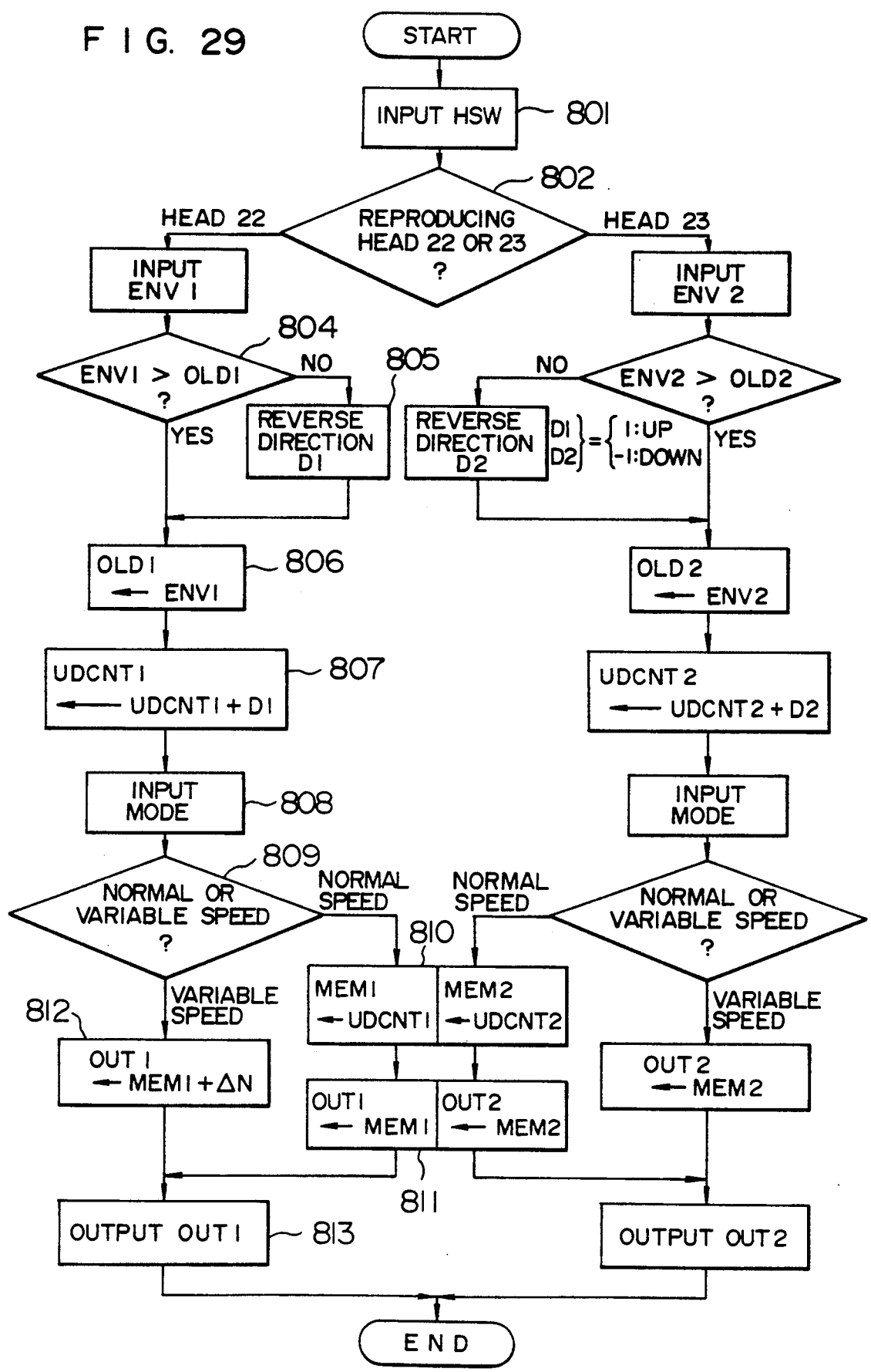
FIG. 29 is a processing flowchart of a microprocessor in FIG. 28.

In the above example, all of the controls have been constructed by hardware circuits for convenience of explanation. However, they can be also realized by softwares of a microprocessor. For example, FIG. 28 shows a construction in the case where the main section of a control circuit corresponding to the foregoing embodiment of FIG. 23 mentioned above is realized by a microprocessor. FIG. 29 shows a flowchart of the main processes. First, in FIG. 28, reference numeral 800 denotes a microprocessor. A head switching signal HSW (heads 22, 23), signals $ENV_1$ and $ENV_2$ (signals which are obtained by detecting the envelopes of the reproduction signals), and a signal MODE (a mode signal of a normal or variable speed reproducing mode) are supplied to the microprocessor 800. The operation of the microprocessor will now be briefly explained with reference to the flowchart of FIG. 29. First, the head switching signal HSW (signal 111 in FIG. 20) is fetched (step 801). A check is made to see if the head to be controlled is the head 22 or the head 23 (step 802). The operations on the side of the head 22 will now be explained hereinbelow. In response to trigger signals (116 and 117 in FIG. 20) which have been generated by counting the time by a timer from the switching timing of the head switching signal or by using a delay circuit or the like, the microprocessor A/D converts the detection signal of the reproduction signal into the digital signal and fetches therein (step 803). Assuming that the digital data is set to $ENV_1$, storage data $OLD_1$ of the preceding sampled value is first compared with the data ENV₁ (step 804). When the preceding data (OLD₁) is larger than the ENV₁, the direction data D₁ is inverted (step 805). The data D₁ has a value of 1 or −1. Upon inverting, the data D₁ is changed from 1 to −1 or from −1 to 1. The processor subsequently stores the data ENV₁ to the OLD₁ (step 806). Further, tracking data UDCNT₁ is updated (807). The reproducing mode is selected (step 808). A check is then made to see if the reproducing mode has been set into the normal reproducing mode or the variable speed reproducing mode (step 809). In the normal reproducing mode, the tracking data is stored into MEM₁ and is generated as output data OUT₁ (steps 810, 811, 813). In the variable speed reproducing mode (the latter case), $\Delta N$ (data which gives $\Delta H$ in FIG. 24A) is added to the value of MEM₁ and the resultant addition value is generated as OUT₁ (steps 812 and 813).

The above control is extremely effective in the case where the tape run and the head rotation are not synchronized and the case where their phase states are close to the synchronized phase states. This is because according to the conventional techniques, the portions where no signal can be derived are concentrated at a few points and such a time relatively continues. From the above viewpoint, the invention is more effective in the variable speed reproducing mode in the reel motor driving in which the phase control of the tape driving is difficult.

According to the invention, in the magnetic recording and reproducing apparatus of the digital recording signal such as an apparatus of the D-2 system, the noises which are peculiar to the memory image and are left on the screen in the variable speed reproducing mode in the conventional techniques are always updated by the new data, so that they can be eliminated. Therefore, an image which can be extremely easily seen can be obtained and there is an effect of the improvement of the performance.

What is claimed is:

1. An apparatus in which a magnetic tape which is moved for magnetic heads attached to a rotary cylinder is traced by said magnetic heads and signals recorded on tracks of said magnetic tape are reproduced, comprising:

a tracking control system including means, attached to said rotary cylinder, for moving the magnetic heads in a width direction of said tracks in accordance with a tracking signal and means for sampling the signals detected by the magnetic heads, for comparing a preceding sampled value and a present sampled value, and for generating said tracking signal such that the present sampled value is larger than the preceding sampled value;

a tape tension control system including means for detecting changes per predetermined time in levels of the signals detected by the magnetic heads, means for giving a tension to the moving magnetic tape and for adjusting said tension in accordance with a tension control signal, and means for generating said tension control signal to adjust the tension according to change amounts per predetermined time of the signal levels to a reference value; and switching means for receiving the signals detected by the magnetic heads and for selectively energizing either one of said tracking control system and said tape tension control system in accordance with a signal level of said received signals.

2. An apparatus according to claim 1, wherein said switching means includes:

means for receiving the signals detected by the magnetic heads, for comparing said signals with a predetermined reference level, for generating a head holding signal when the detected signal level is higher than said reference level;

means for receiving change values of said signal levels, for comparing said change values with a reference level corresponding to a predetermined tape tension, and for generating tension holding signals when it is determined that the tape tension has reached said reference value;

means for deenergizing the tape tension control system and energizing the tracking control system in response to said tension holding signals; and means for deenergizing the tracking control system and energizing the tape tension control system in response to said head holding signals.

3. An apparatus according to claim 2, wherein said detecting means includes:

means for sampling the signals detected by said magnetic heads at predetermined time intervals;

means for accumulating a plurality of sample signals obtained by said sampling every plurality of different areas of one track and for calculating plurality of accumulated values every said areas;

means for comparing said accumulated values of said plurality of areas; and means for deciding the level change per said predetermined time on the basis of the result of the comparison of said comparing means.

4. An apparatus according to claim 2, wherein said detecting means includes:

means for sampling the signals detected by the magnetic heads at predetermined time intervals;

means for calculating a difference between two continuous sample signals; and means for comparing said difference with a predetermined reference value;

and wherein said tension control signal generating means generates said tension control signal according to the result of the comparison of said comparing means.

5. An apparatus in which a magnetic tape which is moved for magnetic heads attached to a rotary cylinder is traced by said magnetic heads and signals recorded on tracks of said magnetic tape are reproduced, comprising:

means, attached to said rotary cylinder, for moving the magnetic heads in a width direction of the tracks in accordance with a tracking signal;

means for sampling the signals detected by the magnetic heads, for comparing a preceding sampled value and a present sampled value, and for generating said tracking signal such that the present sampled value is larger than the preceding sampled value;

means for receiving the signals detected by the magnetic heads, for comparing said signals with a predetermined reference level, and for generating a head holding signal when the detected signal level is higher than said reference level;

means for detecting changes per predetermined time in levels of the signals detected by the magnetic heads;

means for giving a tension to the moving magnetic tape and for adjusting said tension in accordance with a tension control signal;

means for generating said tension control signal to adjust the tension according to a change amount per predetermined time of the signal level to a reference value;

means for receiving the change value of said signal level, for comparing with a reference level corresponding to a predetermined tape tension, and for generating tension holding signals when it is determined that the tape tension has reached the reference value;

means for deenergizing the tension control signal generating means and energizing the tracking signal generating means in response to said tension holding signals; and means for deenergizing the tracking signal generating means and energizing the tension control signal generating means in accordance with said head holding signal.

6. An apparatus according to claim 5, wherein said detecting means includes:

means for sampling the signals detected by said magnetic heads at predetermined time intervals;

means for accumulating a plurality of sample signals obtained by said sampling every plurality of different areas of one track and for calculating a plurality of accumulated values every said areas;

means for comparing said accumulated values of said plurality of areas; and means for deciding the level change per said predetermined time on the basis of the result of the comparison of said comparing means.

7. An apparatus according to claim 5, wherein said detecting means includes:

means for sampling the signals detected by the magnetic heads at predetermined time intervals;

means for calculating a difference between two continuous sample signals; and means for comparing said difference with a predetermined reference value, and wherein said tension control signal generating means generates said tension control signal according to the result of the comparison of said comparing means.

8. An apparatus in which a magnetic tape which is moved for magnetic heads attached to a rotary cylinder is traced by said magnetic heads and digital signals recorded on tracks of said magnetic tape are reproduced, comprising:

two magnetic heads arranged to said cylinder so as to simultaneously trace the adjacent tracks;

means, attached to the cylinder, for individually moving the two magnetic heads in a width direction of the tracks in accordance with a head position control signal; and means for generating a head position control signal to move the magnetic heads in the width direction of the tracks in a manner such that when the recorded signals are reproduced at a speed different from a tape moving speed upon recording, amplitude levels of the reproduction signals by said two magnetic heads at predetermined track positions have a relation of opposite phases.

9. An apparatus according to claim 8, wherein said apparatus further has a memory device and offset means, and in the case of reproducing the recorded signals at the same speed as a tape moving speed upon recording, said memory device stores head positions at which both of the amplitude levels of the reproduction signals detected by the two magnetic heads at predetermined track positions are equal to maximum values, and when the recorded signals are reproduced at a speed different from the tape moving speed upon recording, said offset means generates a head position control signal to shift the position of either one of the two magnetic heads at the predetermined track positions by only a predetermined value from the position corresponding to said maximum values.

10. An apparatus according to claim 9, wherein said offset means includes a microprocessor.

11. An apparatus according to claim 8, wherein said apparatus further has a memory device, fluctuation signal means, and offset means, and in the case of reproducing the recorded signals at the same speed as a tape moving speed upon recording, said memory device stores head positions at which both of the amplitude levels of the reproduction signals detected by said two magnetic heads at predetermined track positions are equal to maximum values, and when the recorded signals are reproduced at a speed different from the tape moving speed upon recording, said fluctuation signal means generates a fluctuation signal to change the positions of both of said two magnetic heads together and said offset means adds a predetermined value to said fluctuation signal and generates a head position control signal such that there is always a difference of only a predetermined value between the positions of both of the heads and the positions corresponding to the maximum values.

12. An apparatus according to claim 11, wherein said fluctuation signal means and said offset means include microprocessor apparatuses.

* * * * *